(12) United States Patent
Scriffignano et al.

(10) Patent No.: US 10,019,681 B2
(45) Date of Patent: Jul. 10, 2018

(54) MULTIDIMENSIONAL RECURSIVE LEARNING PROCESS AND SYSTEM USED TO DISCOVER COMPLEX DYADIC OR MULTIPLE COUNTERPARTY RELATIONSHIPS

(71) Applicant: THE DUN & BRADSTREET CORPORATION, Short Hills, NJ (US)

(72) Inventors: Anthony J. Scriffignano, West Caldwell, NJ (US); David A. Spingarn, Randolph, NJ (US); Barry Rizzolo, Allentown, PA (US); Robin Davies, Macungie, PA (US); Michael R. Young, Bethlehem, PA (US); Laurie Shimer, Stewartsville, NJ (US); John Mark Nicodemo, Bethlehem, PA (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 472 days.

(21) Appl. No.: 14/581,258

(22) Filed: Dec. 23, 2014

(65) Prior Publication Data
US 2015/0186807 A1 Jul. 2, 2015

Related U.S. Application Data

(60) Provisional application No. 61/921,592, filed on Dec. 30, 2013.

(51) Int. Cl.
*G06Q 10/06* (2012.01)

(52) U.S. Cl.
CPC .................................. *G06Q 10/063* (2013.01)

(58) Field of Classification Search
None
See application file for complete search history.

(56) References Cited

U.S. PATENT DOCUMENTS 6,073,138 A 6/2000 de L'Etraz et al.
7,184,968 B2 * 2/2007 Shapiro ............ G06F 17/30867
705/37

(Continued)

OTHER PUBLICATIONS

International Preliminary Report on Patentability (IPRP) dated Dec. 11, 2015 from corresponding PCT/US2014/072202, pp. 18.

(Continued)

*Primary Examiner* — Matthew S Gart
*Assistant Examiner* — Akosua Kyereme-Tuah
(74) *Attorney, Agent, or Firm* — Ohlandt, Greeley, Ruggiero & Perle, L.L.P.

(57) ABSTRACT

A multidimensional recursive and self-perfecting process used to discover dyadic or multi-counterparty relationships between parties, the process comprising: (a) collecting information from a plurality of data sources; (b) discovering dyadic or multi-counterparty relationships between the parties from the collected information; (c) clustering the parties to infer the dyadic or multi-counterparty relationships between the parties based on common or partially intersecting attributes between the parties, thereby forming clustered parties; (d) evaluating the clustered parties for business linkage potential by integrating the collected information and contextually assessing indicia from the data sources to detect and measure consistency and inconsistency for a given party or dyadic or multi-counterparty relationship; (e) positing and evaluating relationship type and role said party plays in each relationship; and (f) assessing the confidence level regarding the likelihood that the dyadic or multi-counterparty relationship exists between the parties.

24 Claims, 28 Drawing Sheets

(56) References Cited

U.S. PATENT DOCUMENTS

| | | | |
|---|---|---|---|
| 7,426,472 | B2 | 9/2008 | Fitzpatrick et al. |
| 8,285,656 | B1 | 10/2012 | Chang et al. |
| 8,316,045 | B1 * | 11/2012 | Breau ............... G06F 17/30545 707/770 |
| 2002/0169658 | A1 * | 11/2002 | Adler .................... G06Q 10/06 705/7.28 |
| 2002/0194049 | A1 | 12/2002 | Boyd |
| 2005/0055266 | A1 | 3/2005 | Foth et al. |
| 2005/0187866 | A1 * | 8/2005 | Lee ........................ G06Q 20/10 705/39 |
| 2009/0138460 | A1 | 5/2009 | Gorti et al. |
| 2011/0219034 | A1 * | 9/2011 | Dekker ................. G06Q 10/10 707/780 |

OTHER PUBLICATIONS

New Zealand First Examination Report dated Jan. 19, 2017 from corresponding New Zealand Patent Application No. 721630, 5 pages.
International Search Report dated Apr. 23, 2015 from corresponding PCT/US2014/072202, pp. 3.
International Written Opinion dated Apr. 23, 2015 from corresponding PCT/US2014/072202, pp. 7.
Extended European Search Report dated Jun. 12, 2017 from corresponding European Patent Application No. 14876453.3, 8 pages.
Second Examination Report dated Mar. 26, 2018 from corresponding Australian Patent Application No. 2014374029, 7 pages.

* cited by examiner

"On behalf of" component leverages known business-to-Business relationships, other data and automated curation and adjudication to make consistent decisions.

- Source data implies a relationship
- Automated and/or manual curation determines next steps
- Outcomes include
  - Link-establish as specific or non-specific type of relationship
  - Merge /duplicate removal
  - Out of business

| Name | Address | Name | Address |
|---|---|---|---|
| Zelda Agency | New York City, NY | North Vision Enterprises, LLC | Greenwich, CT |
| The Chronicle | San Diego, CA | RGX Investments | San Diego, CA |

Paying bills or acting as guarantor on behalf of another entity can imply owenership
- North Vision enterprises may own Zelda Agency
- RG investments may own The Chronicle

FIG. 3

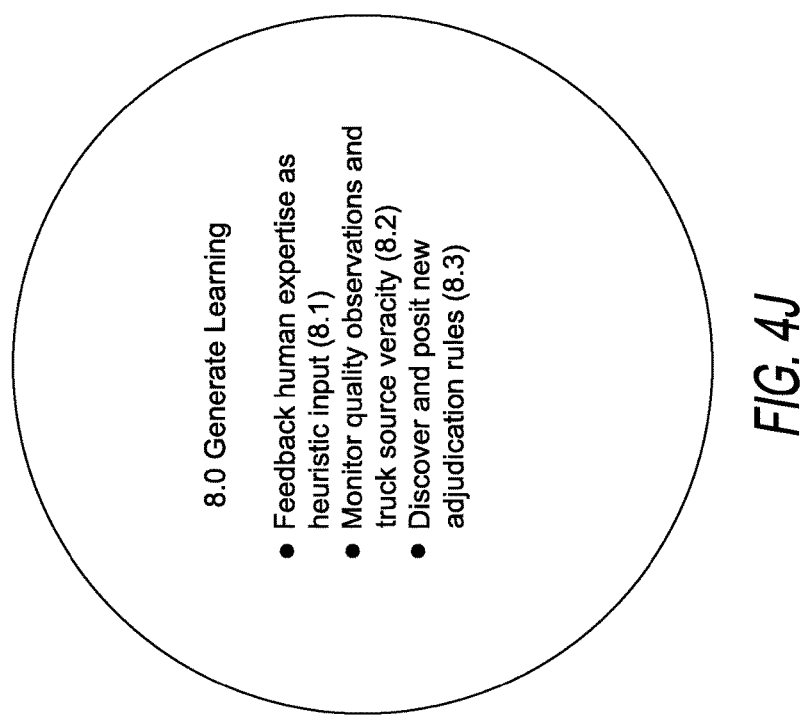

MULTIDIMENSIONAL RECURSIVE LEARNING PROCESS AND SYSTEM USED TO DISCOVER COMPLEX DYADIC OR MULTIPLE COUNTERPARTY RELATIONSHIPS

CROSS-REFERENCED APPLICATION

This application claims priority to U.S. Provisional Application No. 61/921,592, filed on Dec. 30, 2013, which is incorporated herein by reference thereto in its entirety.

BACKGROUND

1. Field

The present disclosure generally relates to a process for discovery, curation, adjudication and synthesis of complex dyadic and multiple counterparty global (that is, intra- and inter-jurisdictional and cross-border) business relationships. In particular, the disclosure relates to the creation of a system capable of discovering, qualifying, and recording dyadic and multi-counterparty relationships between business entities (hereinafter referred to as "business linkages"). The process comprises source-agnostic and non-deterministic analytic sub-processes which transform, measure, critically evaluate, adjudicate and refactor using clustering and affinity-recognition routines, which feed into self-improvement routines, so that the process and system functions as a highly recursive system that posits, tests, implements and monitors new strategies for the identification, confirmation, and maintenance of business linkages.

2. Discussion of the Background Art

The overall problem is to understand comprehensive relationships among business counter-parties. Typically, such understanding is applied to use cases involving total risk or total opportunity. Such understanding can also apply to more complex use cases, such as predictive analytics, remediation and scenario formulation.

Prior art for determination of the relationships, as exemplified in FIG. 6, attached hereto, include solutions which group entities having the same name together, but they are limited to use of only the name to trigger adjudication of the similarity and potential relationship. The technical problem is that such solutions do not provide effective automated and evolving curation capabilities and/or the ability to triangulate on a relationship by considering it from the perspective of multiple sources or indicia, some of which may be identified through analytic techniques. Also, such solutions typically either lack a manual curation and adjudication option, or perform their automated tasks with insufficient precision and accuracy to effectively filter potential relationships and ensure efficient use of the correct manual adjudication resources and processes. Without sufficient filtering or precision, potential relationships go through manual adjudication using a single "one size fits all" approach. The result is either a lack of reproducibility and difficulty driving economies of scale, for solutions with manual adjudication options, or for solutions without manual adjudication options, inconsistent, poor accuracy insufficient for all but the least critical business applications.

The technical effect of the present disclosure overcomes the disadvantages of conventional corporate linkage systems and processes by using a combination of (a) automated, recursive, and manual curation, (b) rules-based adjudication of sources and source combinations, and (c) multiple alternative indicia, to accurately determine the interrelationship context of business entities. Automated rules are leveraged against historical experiences and representative samples, results are thoroughly evaluated to determine "truth", and rule improvement and tuning enables creation of a refined set of rules maximizing automation to enable scalability, while allowing for targeted and "most fitting" manual curation and adjudication strategies to be utilized as necessary.

Results assessment and tuning exploit detailed heuristic and analytic techniques, and include both established and emerging knowledge as well as learning algorithms and other approaches for adjudication of heterogeneous and highly dynamic, often unstructured data.

By supporting recursive testing and refinement of automation rules, and customization to optimize performance and minimize manual efforts, the present system maximizes effectiveness and the ability to leverage an increasing number of sources over time to widely expand scope without significantly increasing manual efforts, while continuing to accurately determine contextual relationships.

The present disclosure leverages logic to uniquely identify business entities through a robust identity resolution process, as a foundation upon which to evaluate context.

The present disclosure generates batch and transactional interactions, having either standardized, dynamic, and/or proprietary formats, enabling interaction with human resources who further adjudicate and evaluate the indicia to determine context.

The present disclosure also generates batch and transactional interactions, having either standardized, dynamic and/or proprietary formats, to synthesize updates and persist contextual insight.

Sources and processes are used to both establish and maintain contextual insight, by monitoring status, detecting active and passive change and initiating curation and adjudication as necessary.

The present disclosure precisely tracks results, and reporting tools are used to evaluate veracity and best-use of sources for tuning and diagnostic purposes, and self-learning features to improve performance based on experience. Reporting tools are also used to assess progress against known opportunities.

Manual discovery, curation and adjudication is performed by human resources having the best fit of experience and ability, based on complexity level, with rule based decisions routing to the resources.

The present disclosure also provides many additional advantages, which shall become apparent as described below.

SUMMARY

A multidimensional recursive process used to discover dyadic or multi-counterparty relationships between parties, the process comprising: (a) collecting information from a plurality of data sources; (b) discovering dyadic or multi-counterparty relationships between the parties from the collected information; (c) clustering the parties to infer the dyadic or multi-counterparty relationships between the parties based on common or partially intersecting attributes between the parties, thereby forming clustered parties; (d) evaluating the clustered parties for business linkage potential by integrating the collected information and contextually assessing indicia from the data sources to detect and measure consistency and inconsistency for a given party or dyadic or multi-counterparty relationship; (e) positing the roles played and/or direction of the relationship, by identifying the party most likely to be superior, such as headquarters or parent, and (f) assessing the confidence level regarding the likelihood that the dyadic or multi-counterparty relationship exists, and is of the posited relationship type and direction between the parties.

The process further comprises the step of leveraging self-learning to improve the ability of the multidimensional recursive process to evaluate and/or assess potential that the dyadic or multi-counterparty relationship exists between the parties. The step of leveraging self-learning is at least one selected from the group consisting of: (a) using seed rules posited for evaluating the potential that the dyadic or multi-counterparty relationship exists between the parties; (b) applying applicable candidates from the currently known corpus of rules to the collected information to evaluate the clusters of the parties for quantity, quality and/or character of relationships discovered; (c) using detailed truth determination to leverage expertise and additional information to assess truth about potential relationships in the clustered parties; (d) learning which of the seed rules and the plurality of sources are most useful in determining that the dyadic or multi-counterparty relationship exists between the parties, (e) continuously assessing the veracity of each of the plurality of sources, and (f) leveraging experience to discover and posit adjudication rules proposing additional indicia, new rules or enhancement to the seed rules.

The process further comprises the step of continuously curating the adjudication rules, wherein the process leverages experience gained through the detailed truth determination to tune, improve and/or adjust the seed rules used for evaluating the potential that the dyadic or multi-counterparty relationship exists between the parties.

The process further comprises the step of using identity resolution to establish and reference identifiers for discovering dyadic or multi-counterparty relationships between parties external to the process.

The clustering of the parties is based on a flexible range of indicia. The indicia is at least one selected from the group consisting of: behavioral data, names, inception characteristics, size, and industry.

The common or partially intersecting attributes are at least one attribute selected from the group consisting of: Internet presence details, account or other external identifier, name similarity, address, secondary address, related individual, on behalf of relationships, and knowledge, opinion, or hypothesized relationships.

The step of assessing the confidence level regarding the likelihood that the dyadic or multi-counterparty relationship exists between the parties and is based upon rules related to prior experience with similar data points for other parties and potential relationships, including the veracity of the source from which the data points were discovered. In addition, attributed proximity as a function of shared indicia across geographic or geo-political intervals, may be used as input to curation and adjudication.

Furthermore, step (f) improves the processes ability to assess potential and existing relationships and whether they (i) should automatically qualify to become business linkages, (ii) require more collection of information and evaluation of the clustered parties for business linkage potential, or (iii) are insufficiently likely to exist and warrant no further active attention.

Preferably, collecting information involves discovery of at least one selected from the group consisting of: identifying new sources of the information, evaluating the quality of the source, understanding changes in the data environment, and developing new technologies and processes for identification of appropriate data.

Another embodiment is a system that comprises: a processor; and a memory that contains instructions that are readable by the processor, and that when read by the processor cause the processor to perform actions of:
a. collecting information from a plurality of data sources;
b. discovering dyadic or multi-counterparty relationships between the parties from the collected information;
c. clustering the parties to infer the dyadic or multi-counterparty relationships between the parties based on common or partially intersecting attributes between the parties, thereby forming clustered parties;
d. evaluating the clustered parties for business linkage potential by integrating the collected information and contextually assessing indicia from the data sources to detect and measure consistency and inconsistency for a given party or dyadic or multi-counterparty relationship;
e. considering attributed proximity as a function of shared indicia across geographic or geo-political intervals, as an input to curation and adjudication; and
f. assessing the confidence level regarding the likelihood that the dyadic or multi-counterparty relationship exists between the parties.

Further objects, features and advantages of the present disclosure will be understood by reference to the following drawings and detailed description.

BRIEF DESCRIPTION OF THE DRAWINGS

FIG. 3 depicts a source which reveals existence of an "on behalf of" relationship between two entities, such that this "on behalf of" relationship can serve as a discovery source.

FIGS. 4a-4k are diagrammatic representations of the recursive learning process according to the present disclosure.

DETAILED DESCRIPTION OF THE PREFERRED EMBODIMENT

This system and process effectuates evaluation and correlation of multiple sources to Discover relationships and potential relationships (based on common data attributes, services, or behavior), Curate (accumulate, store, maintain, and update), and Adjudicate (evaluate and act upon) those relationships vs. previously discovered insight about the involved counterparties and their relationships, drive recursive collection of additional information as needed, and create consistently classified and actionable information globally.

Figure 1:
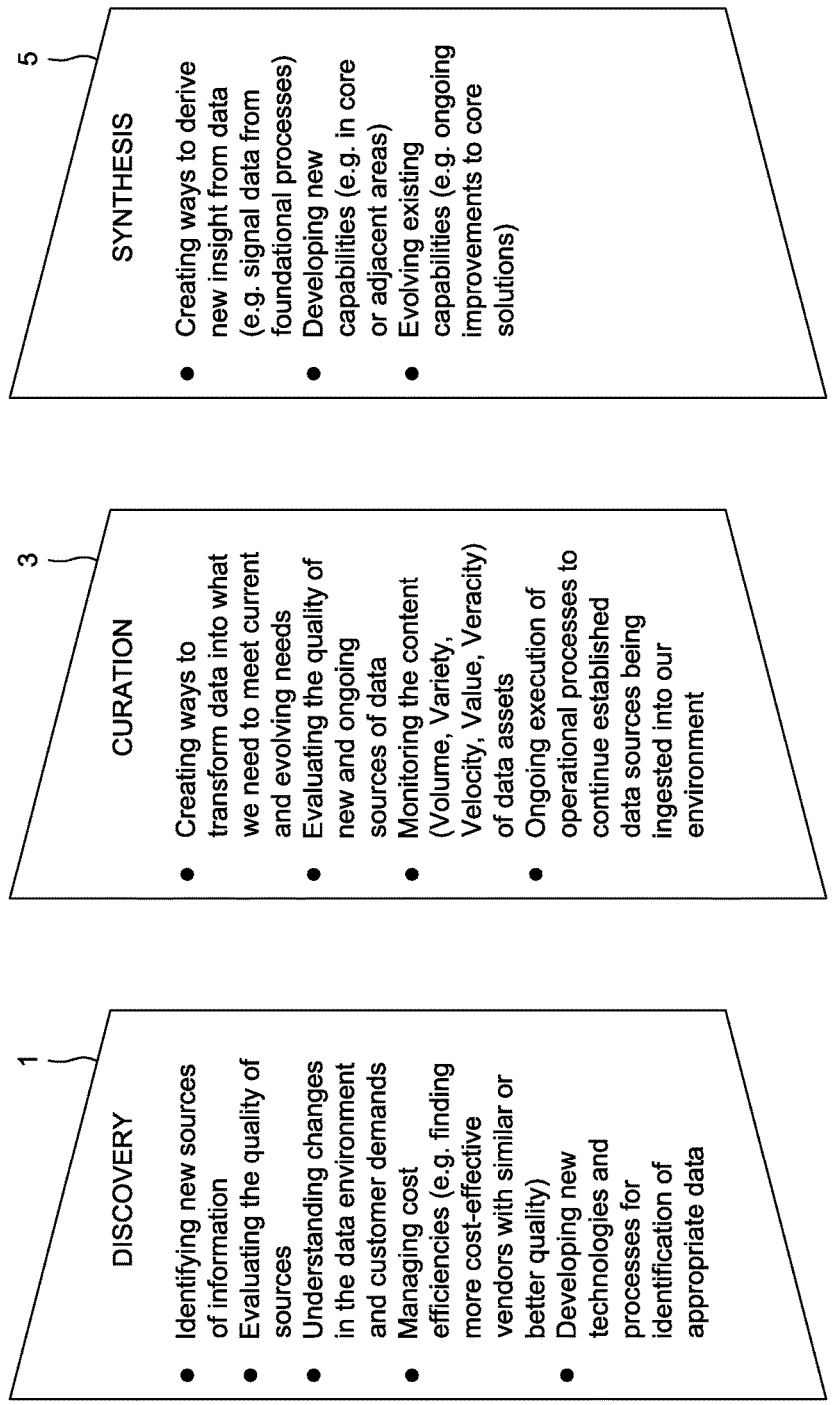
FIG. 1 is a block diagram representing the three primary steps of discovery, curation and synthesis used in the present disclosure.
Figure 2:
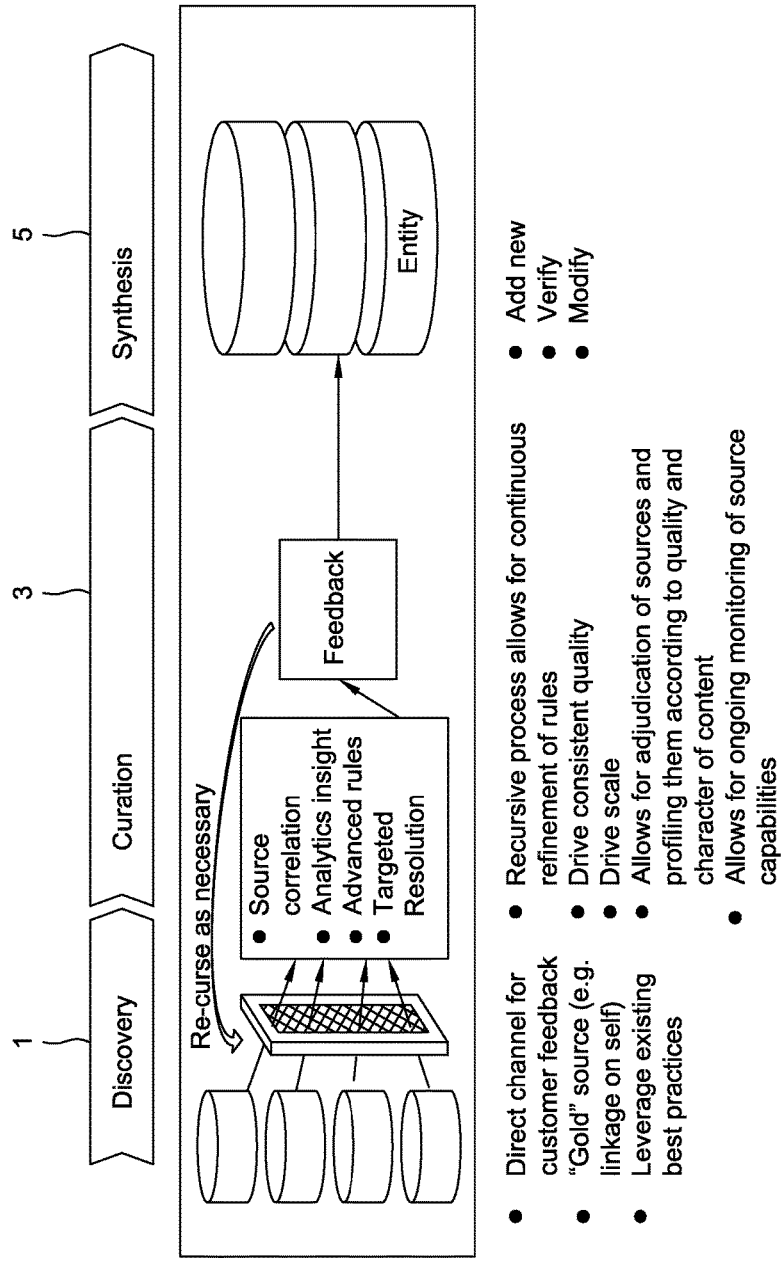
FIG. 2 depicts the system as a set of inter-related activities leveraging automation and recursion to sustainably drive quality according to the present disclosure.
Figure 4A:
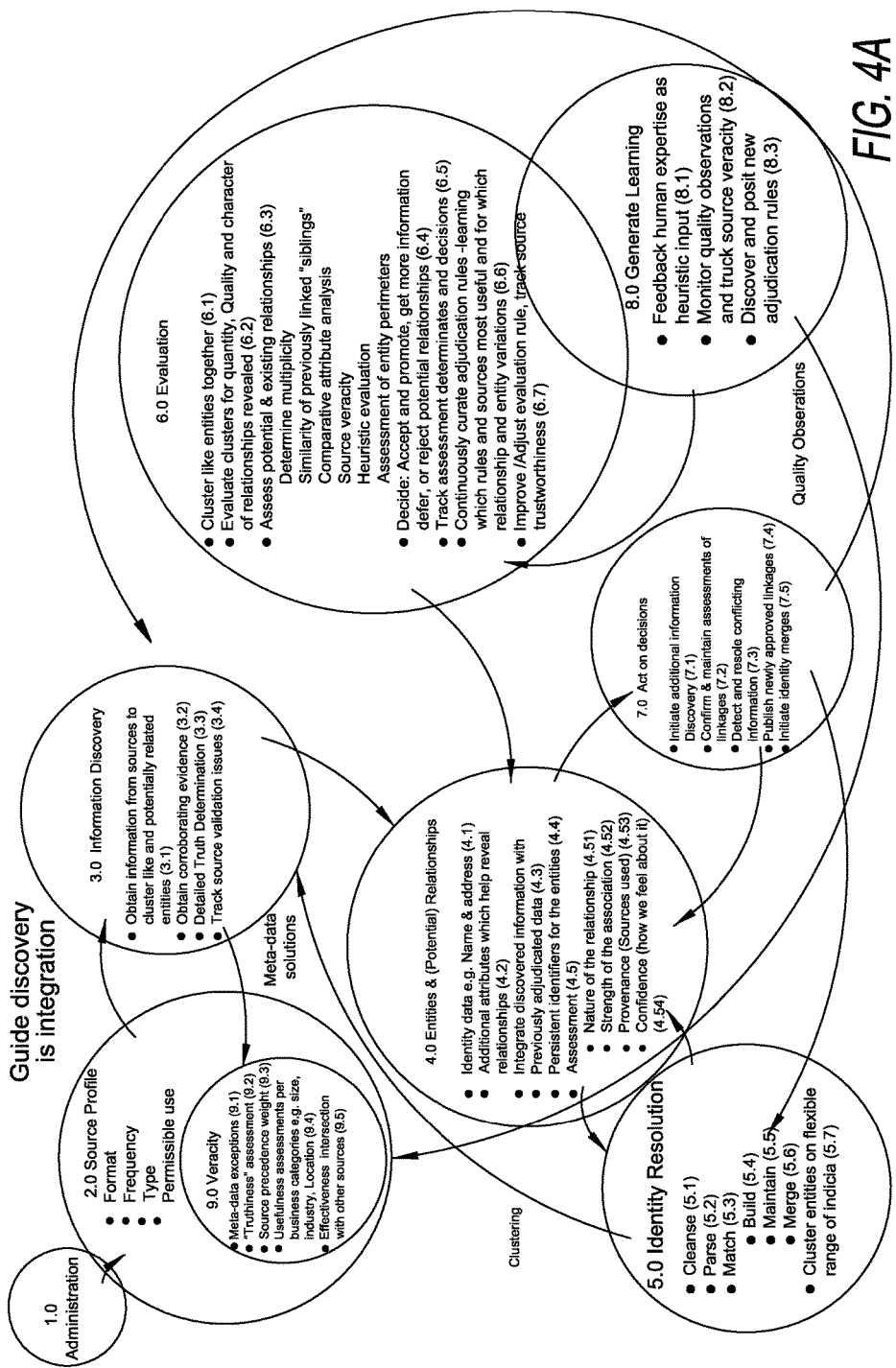
Figure 4B:
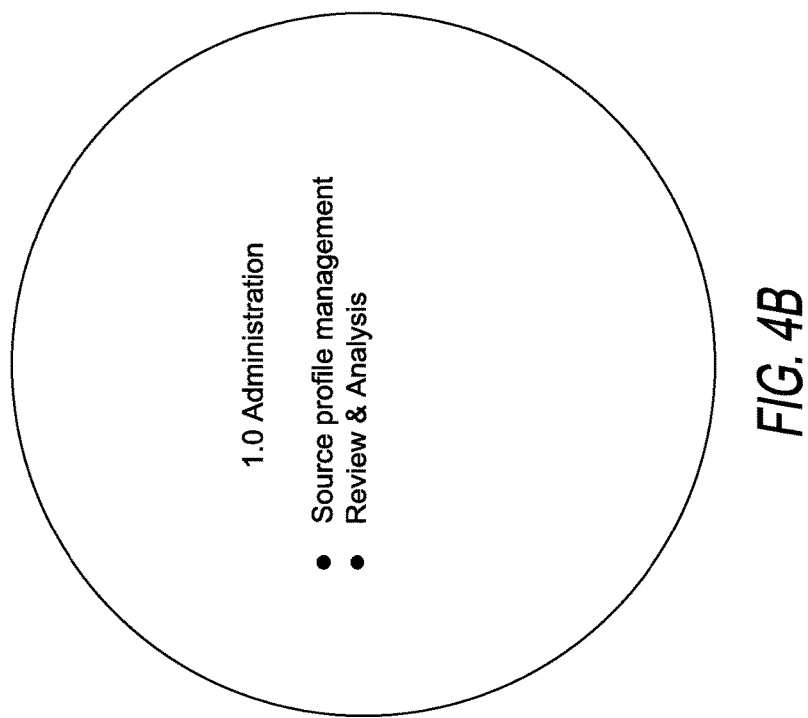
Figure 4C:
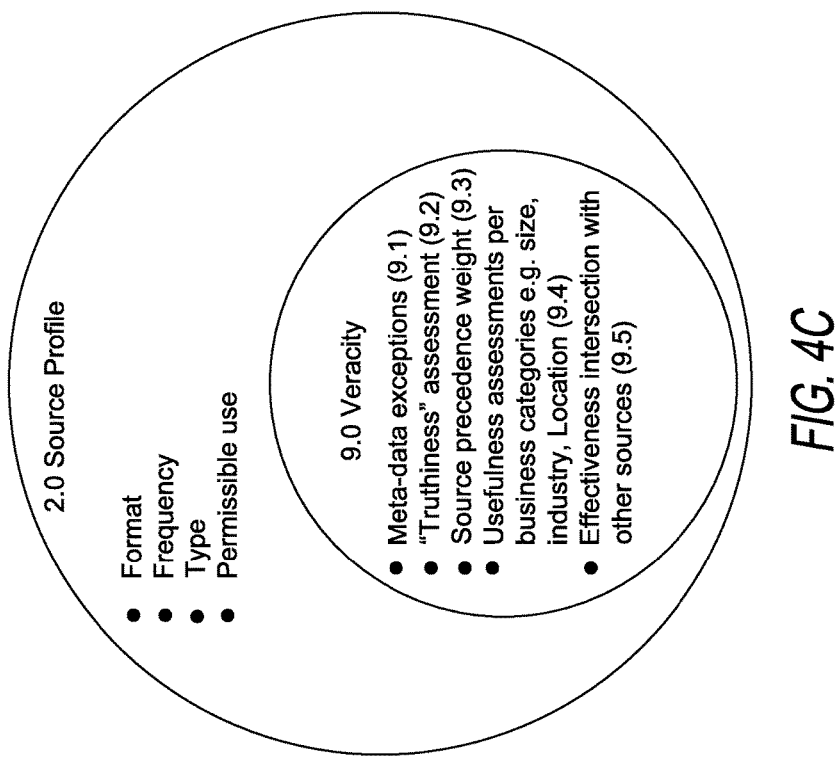
Figure 4D:
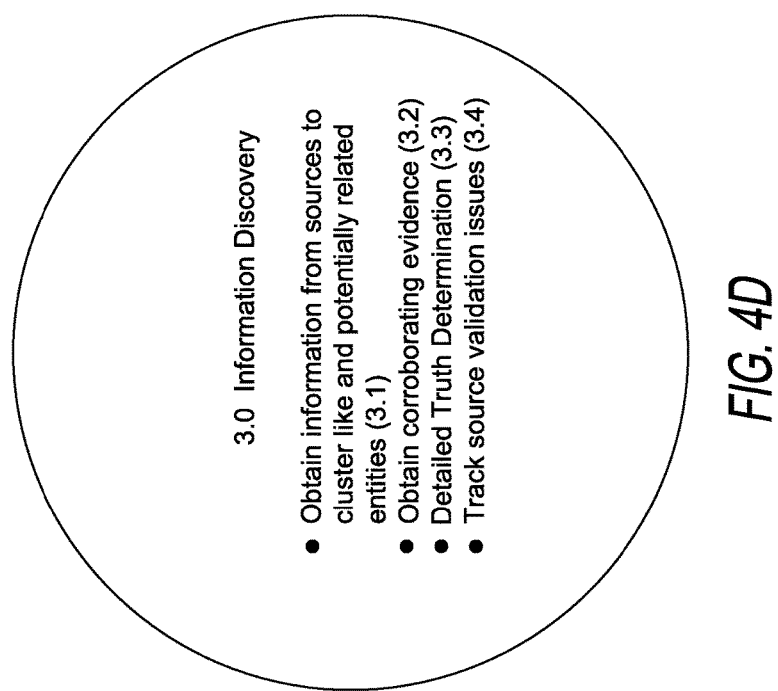
Figure 4E:
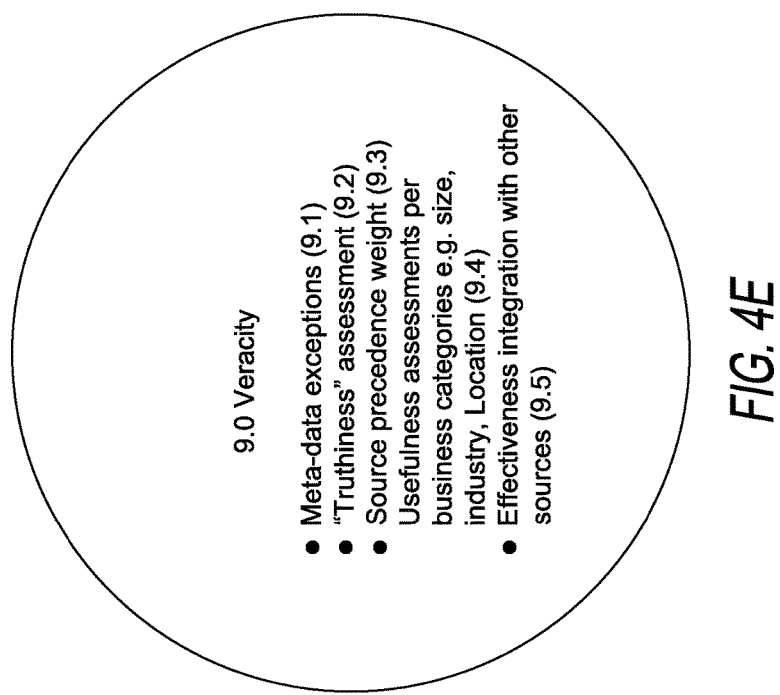
Figure 4F:
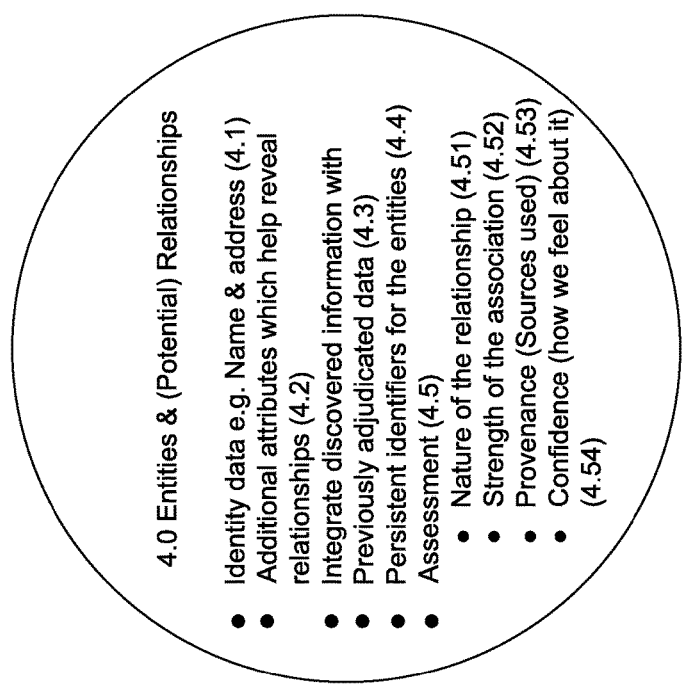
Figure 4G:
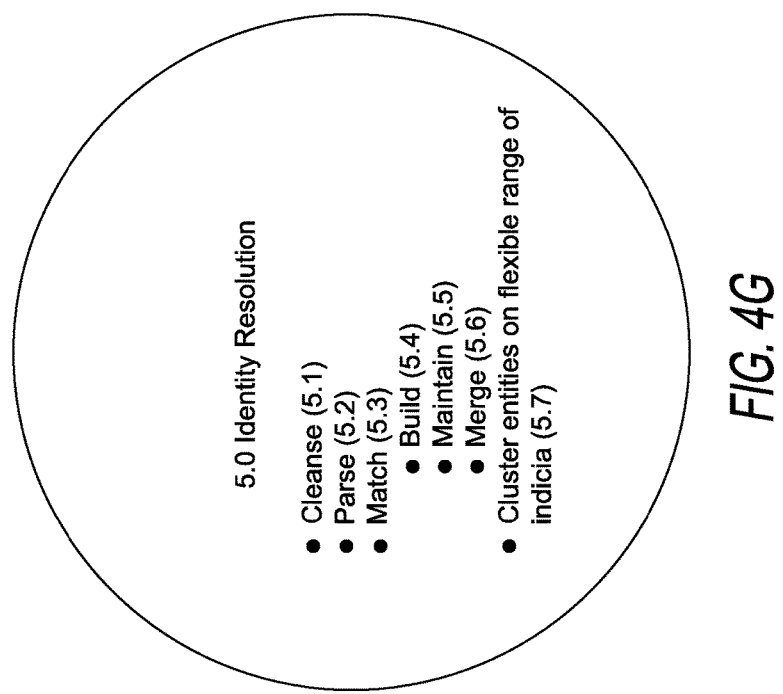
Figure 4H:
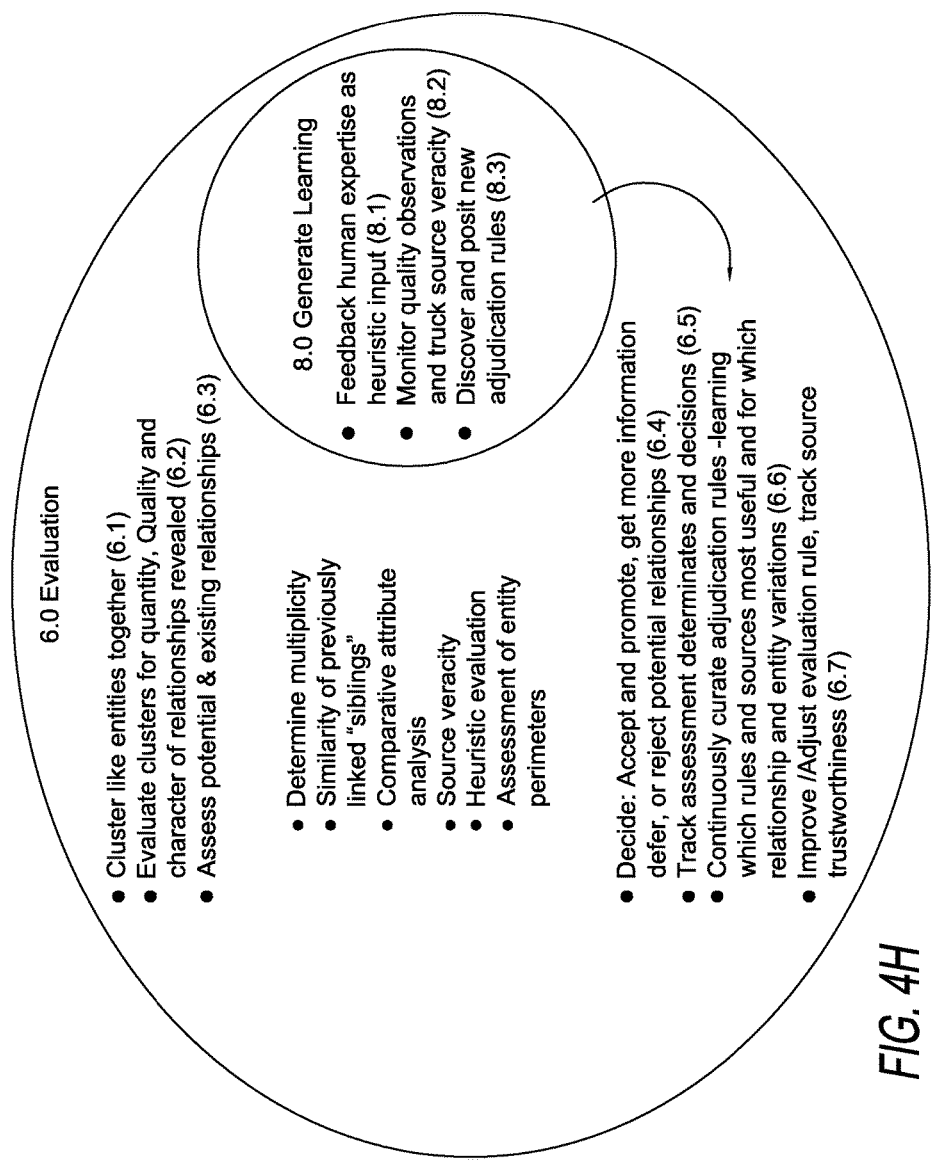
Figure 4I:
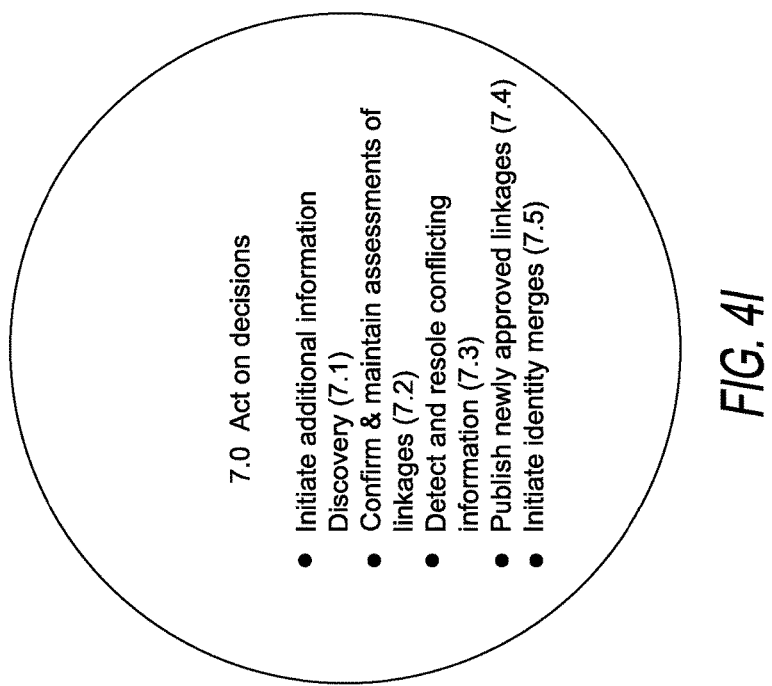
Figure 4K:
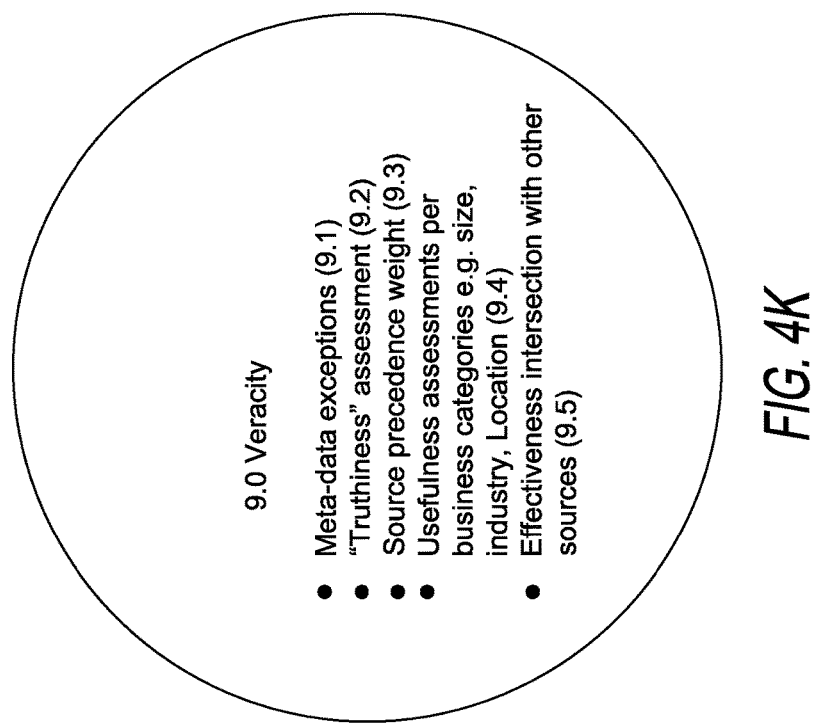

The present disclosure can best be understood by referring to the figures, wherein FIGS. 1 and 2 is a block diagram representing the three primary steps of discovery 1, curation 3 and synthesis 5 used in the present disclosure.

FIG. 2 depicts the recursive process leveraging automation to sustainably drive quality according to the present disclosure, wherein discovery step 1 involves third party business-to-business (B2B) relationships, discovered relationships, e.g., clustering, web and discoverable content, etc. To enhance discovery step 1, it is helpful to provide a direct channel for customer feedback, gold sources, e.g., linkage on self, and leverage existing best practices. Curation 3 includes source correlation analytics, insight advanced rules, and targeted resolution. Curation also includes feedback to discovery 1 to initiate collection of additional information as necessary. This recursive curation process allows for continuous refinement of rules, drives consistent quality, drives scale, allows for adjudication of sources and profiling them according to quality and character of content, and allows for ongoing monitoring of source capabilities. Finally, synthesis step 5 adds new linkages and verifies linkages. Synthesis is also sometimes used to refer to the process of initiating additional Discovery steps, such as by generating input to Discovery processes.

Discovery:

The present disclosure leverages a variety of sources to Discover relationships between entities. For example, it will group records having a common account number or identifier. Business Identity attributes of the entity records are associated with existing known entities, or may be used to justify reflection of a new entity in master database. Once the identity is resolved for each of the entities involved in a group or cluster of counterparties, the group of counterparties, referred to as "entities" because they have been associated with maintained persistent keys, is evaluated to assess the potential relationships among them.

Curation and Adjudication:

Scenarios vary depending on whether contextual relationships have been previously determined and persisted for all, some, or none of the members of the associated group. Where relationships have previously persisted, the receipt of new source information is used to confirm existing status, or to detect potential changes (conflicts). Conflicts are raised for further adjudication, while confirmations are used to maintain freshness assessments in a master database.

Where a given entity has not been previously determined to exist in the associated context of a group of other entities, potential relationships are identified to associate it with other members of its group, using rules to determine the most likely association. This aggregation may include the assumption that a member already known to provide context to other group members is most likely to provide similar context to the entity of focus. Attributes such as geographic proximity and similarity of business activities are some of the indicia which may be used to automatically adjudicate potential relationships.

Once the best or most likely relationship is identified for a particular entity, the veracity of the source(s) and performance of various indicia are used to determine whether the context can be automatically established, or whether the observation requires further Discovery or Adjudication. Also, prior experience of this same system in determining presence or absence of linkage based on the same values of same indicia may be used to guide curation of currently considered relationships. Simultaneously, incremental knowledge is augmented regarding the cumulative performance of particular sources and for the stratification of various sub-aggregations of sources according to observed performance. If further Discovery and Manual Adjudication are necessary, the best fitting type of resource & workflow is identified, a task is created (Synthesis) as per the required interface, and the actions are initiated.

Manual discovery, curation and adjudication is performed by several types of resources including low experience for simplified and granular work tasks, moderate experience specialists, and finally individuals who are domain experts. Work tasks may consist of resolution of a pair of entities, or of sets of entities.

Results of any Discovery and Manual Adjudication are tracked and assessed as inputs to the automated curation and adjudication rules, which look to synthesize additions and updates to the master database, or additional tasks for further Discovery and Adjudication.

Discovery Source:

FIG. 3 depicts a type of source which may be used to discover business-to-business relationships. In this example, one entity on a record may perform some service or provide assurance on behalf of the other entity. The existence of an "on behalf" of relationship reveals the existent dyadic relationship, which may then be curated and adjudicated to determine appropriate next steps. Depending on the source, source veracity, ability to correlate other relationship discovery sources, and available data points, decisions can be made to automatically accept as a specific linkage and type, gather additional data points using a chosen approach, reject, or defer pending spontaneous discovery of additional data points.

FIGS. 4a-4k are diagrammatic representations of the recursive learning process according to the present disclosure. The present disclosure relates to the creation of a new system which discovers and records dyadic and multi-counterparty relationships between business entities (hereafter "business linkages"). The present disclosure is comprised of source-agnostic and non-deterministic analytic sub-processes which transform, measure, critically evaluate, adjudicate and refactor using clustering and affinity-recognition routines, which feed into self-improvement routines, so that the Present disclosure as a whole functions as a highly recursive system that posits, tests and implements new strategies for the identification, confirmation, and maintenance of business linkages.

The present disclosure is able to be configured including per Source Profile (2.0) to draw inputs from multiple sources in Information Discovery (3.0) and discover potential business linkages between two or more entities. It does this recursively, sometimes consuming a source in toto in order to deduce business linkages from the undifferentiated data, other times adopting a directed, inductive approach to pursue information about specific business entities. It may also collect indicia values from two or more sources for various entities, then infer relationships based on aggregating that knowledge. The present disclosure leverages Identity Resolution (5.0) capabilities to resolve identities of the entities and enable recognition of the entity from multiple perspectives, and integration of those perspectives. Independently of Identity Resolution, the present disclosure identifies and where applicable implements specialized, novel techniques to cluster (6.1) business entities together, based on the information discovered above.

The present disclosure exploits known and previously qualified relationships among the business entities currently under consideration, as well as among previously considered entities. It exploits additional attributes about all the entities as well. The integrated data is continually Evaluated (6.2, 6.3) to determine whether each potential relationship is sufficiently understood to qualify for addition to the corpus of known business linkages. Other outcomes of the evaluation are (a) recognition of a deficiency or "gap" in data and therefore a need to Initiate Additional Information Discovery (7.1), (b) deferment of action pending passive receipt of more corroborative data and capture of this Assessment (4.5), (c) determination of opportunities to modify or Initiate Additional Information Discovery (7.1) to justify modification of existing business linkage when conflicts are identified, and/or (d) determination of opportunities to confirm consistent existing business linkage and maintain its Assessment (4.5).

Key Features Include:
  Information Discovery and Curation: The system iteratively leverages Information Discovery (3.0) to collect, and Integrate Discovered Information (4.3) which may be predictive of relationships and business linkage.
  Leverages Identity Resolution (5.0) to establish and reference identifiers for discovered entities external to the system, including but not limited to organizations, individuals, and conceptual entities such as financial instruments. Identity Resolution enables consistent references over the course of time, and the system may use any identity resolution strategies available to it (including recent ones around Individuals).
  Cluster Entities based on a flexible range of indicia (5.7) including but not limited to behavioral data, names, inception characteristics, size, and industry, as a source to Information Discovery of potential relationships, leveraging Identity Resolution to infer potential relationships for further Evaluation (6.0).
  Clustering (6.1) entities to infer relationships based on common or partially intersecting attributes such as:
    a. Internet presence details
    b. Account or other external identifier
    c. Name Similarity
    d. Address
    e. Secondary Address (mailing address)
    f. Related individual
    g. "On behalf of" relationships
    h. Knowledge, opinion, or hypothesized relationships, whether internally or externally sourced
  Evaluation (6.0) of clusters for Linkage potential, by Integrating Discovered Information (4.3) and contextually assessing potential and existing relationships (6.3) by balancing indicia from the sourced data against each other, and against previously confirmed information about the subject entities and potential relationships. This includes correlating multiple sources and indicia above to detect and measure consistency and inconsistency for a given entity or relationship. It also includes assessment of entity perimeters (6.3) to determine Merge (5.6) opportunities. It also includes profiling of indicia values or partial values to consider level of dispersion across various populations or denominators, such as industry, size of extant family, classification, shared supplier relationships, or other contextual factors.
  Assessing (6.3) the confidence level regarding the likelihood that the posited relationship exists and that the nature of the relationship is of a qualifying type (as not all relationships are actionable), using rules based inter alia upon the present disclosure's prior experience with similar data points for other entities and potential relationships.
  Leveraging self-learning to become more effective and efficient over time:
    i. System accepts "seed rules" posited for evaluating potential relationships
    j. The present disclosure applies applicable candidates from the currently known corpus of rules to the accumulated and integrated information to Evaluate Clusters for Quantity, Quality, and Character of relationships revealed (6.2)
    k. Detailed Truth Determination (3.3) leverages expertise and additional Information Discovery to assess truth about the relationships in clusters of various categories
    l. Continuously curate adjudication rules—learning which rules and sources most useful and for which relationship and entity variations (6.6).
    m. Veracity of sources is assessed continuously and tracked to support evolution of rules, including "Truthiness" assessment (9.2), Usefulness assessments per business categories (9.4). Interaction synergies are measured and prioritization of sources is adjusted and tracked through Source precedence weight (9.3), and Effectiveness of intersecting sources (9.5). Predictiveness of specific values of indicia are assessed and tracked, and provide input to future curation of clusters based on same indicia values.
    n. The system leverages experience to Discover and Posit New Adjudication Rules (8.3) proposing additional indicia, new rules or enhancement to the current rule set, to improve ability to Assess Potential and Existing Relationships (6.3) and whether they:
      i. Should automatically qualify to become business linkage
      ii. Require more Information Discovery (3.0) and Evaluation (6.0), and initiates such steps
      iii. Are insufficiently likely to exist and warrant no further active attention
  Continuously Curate Adjudication Rules (6.6): Leverage experience to mature evaluation rules. For example, when two or more sources predict relationships for the same business entity, and their conclusions about related entities are contradictory, the Present disclosure leverages experience gained through Detailed Truth Determination (3.3) to tune, Improve and Adjust the Evaluation Rules (6.7) used to interpret the potential relationships. When similar raw information is available from both sources, the outcome of additional discovery is used to adjust the rules used to interpret information within the source whose conclusion was originally less accurate.

In addition to maturing the understanding of relationships not already established as business linkage, the same information is used to Assess Existing Relationships (6.3) previously accepted as business linkage. Where the independently discovered information supports and confirms the linkages as they exist, the freshness and confidence of those relationships is maintained in their Assessment (4.5). Where the information contradicts existing linkages, it is used to Initiate Additional Information Discovery (7.1) for additional data points to determine the current state of the relationship and either confirm or correct it if necessary.

In addition to maturing understanding of newly discovered relationships, and assessing previously synthesized relationships, the system tracks potential relationships previously adjudicated and determined to not exist, thus building knowledge not only of known relationships, but also where a relationship of a certain type does not exist.

Figure 5:
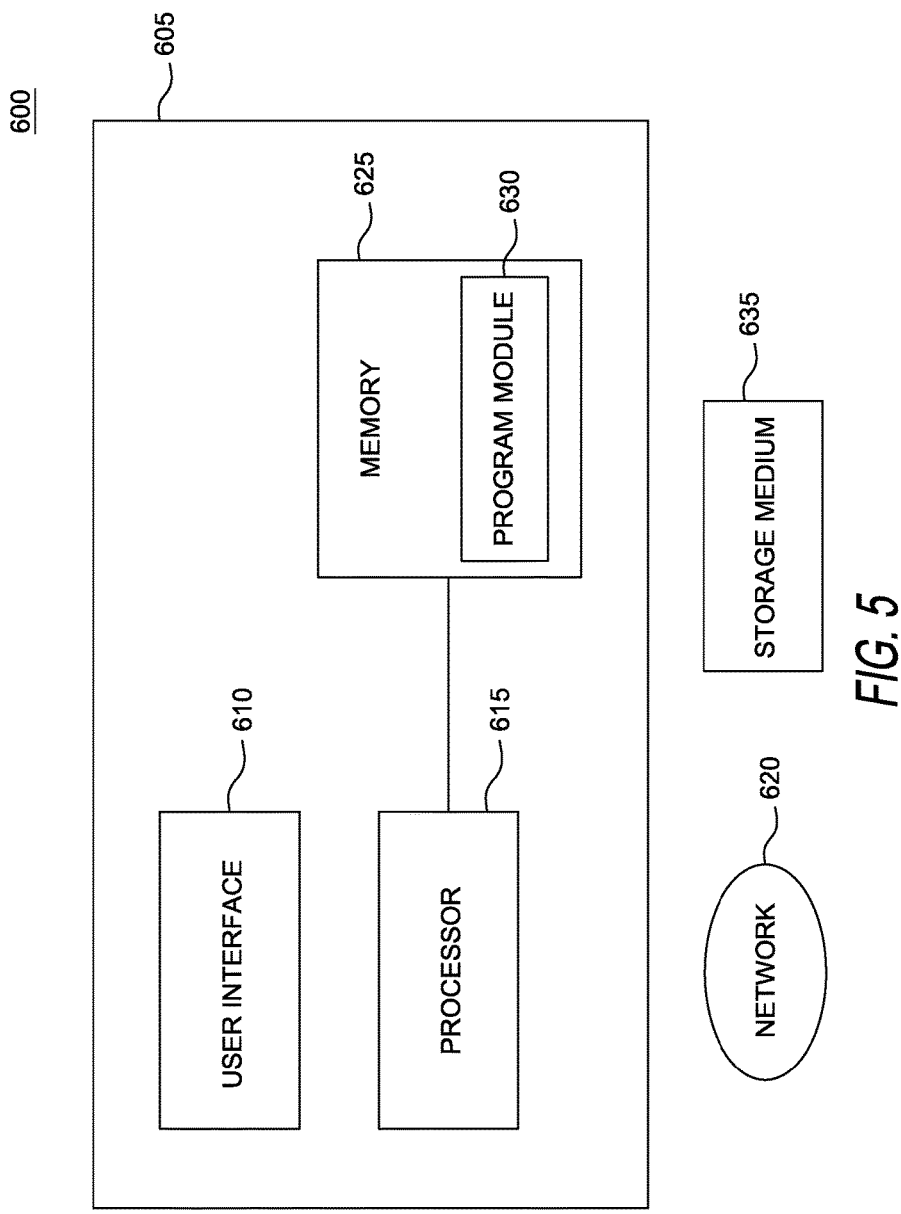
FIG. 5 is a block diagram depicting a computer system which implements the processes of the present disclosure.
Figure 6:
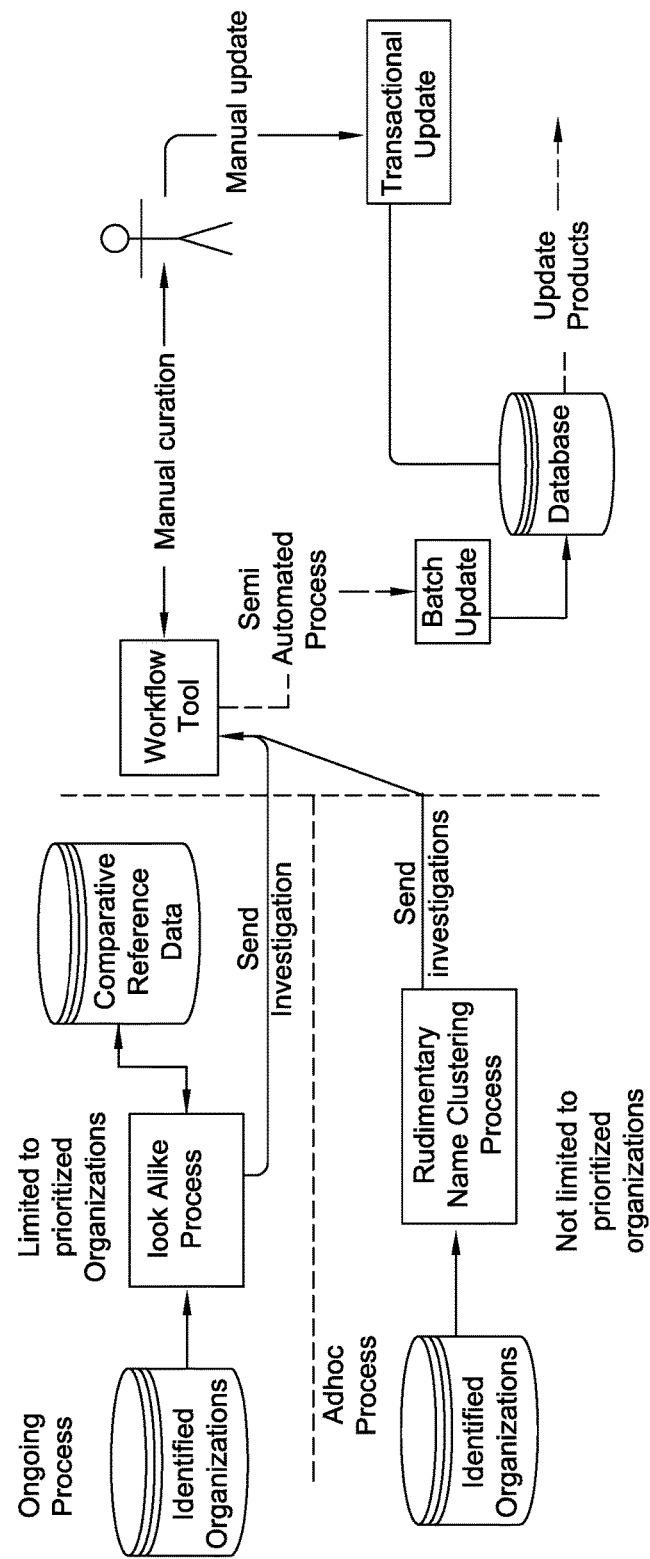
FIG. 6 is a schematic diagram of a conventional corporate linkage process.

FIG. 5 is a block diagram of a system 600 for employment of the present disclosure. System 600 includes a computer 605 coupled to a network 3930, e.g., the Internet.

Computer 605 includes a user interface 610, a processor 615, and a memory 620. Computer 605 may be implemented on a general-purpose microcomputer. Although computer 605 is represented herein as a standalone device, it is not limited to such, but instead can be coupled to other devices (not shown) via network 630.

Processor 615 is configured of logic circuitry that responds to and executes instructions.

Memory 620 stores data and instructions for controlling the operation of processor 615. Memory 620 may be implemented in a random access memory (RAM), a hard drive, a read only memory (ROM), or a combination thereof. One of the components of memory 620 is a program module 625.

Program module 625 contains instructions for controlling processor 615 to execute the methods described herein. For example, as a result of execution of program module 625, processor 615 perform the actions of: (a) collecting information from a plurality of data sources; (b) discovering dyadic or multi-counterparty relationships between the parties from the collected information; (c) clustering the parties to infer the dyadic or multi-counterparty relationships between the parties based on common or partially intersecting attributes between the parties, thereby forming clustered parties; (d) evaluating the clustered parties for business linkage potential by integrating the collected information and contextually assessing indicia from the data sources to detect and measure consistency and inconsistency for a given party or dyadic or multi-counterparty relationship; and (e) assessing the confidence level regarding the likelihood that the dyadic or multi-counterparty relationship exists between the parties.

The term "module" is used herein to denote a functional operation that may be embodied either as a stand-alone component or as an integrated configuration of a plurality of sub-ordinate components. Thus, program module 625 may be implemented as a single module or as a plurality of modules that operate in cooperation with one another. Moreover, although program module 625 is described herein as being installed in memory 620, and therefore being implemented in software, it could be implemented in any hardware (e.g., electronic circuitry), firmware, software, paper, or a combination thereof.

User interface 610 includes an input device, such as a keyboard or speech recognition subsystem, for enabling a user to communicate information and command selections to processor 615. User interface 610 also includes an output device, such as a paper, display or a printer. A cursor control, such as, but not limited to, a mouse, track-ball, or joy stick, allows the user to manipulate a cursor on the display for communicating additional information and command selections to processor 615.

Processor 615 outputs, to user interface 610, a result of an execution of the methods described herein. Alternatively, processor 615 could direct the output to a remote device (not shown) via network or paper 630.

While program module 625 is indicated as already loaded into memory 620, it may be configured on a storage medium 635 for subsequent loading into memory 620. Storage medium 635 can be any storage medium that stores program module 625 thereon in tangible form. Examples of storage medium 635 include, but not limited to, a floppy disk, a compact disk, a magnetic tape, a read only memory, an optical storage media, universal serial bus (USB) flash drive, a digital versatile disc, or a zip drive. Alternatively, storage medium 635 can be, but not limited to, a random access memory, or other type of electronic storage, located on a remote storage system and coupled to computer 605 via network 630.

Figure 7:
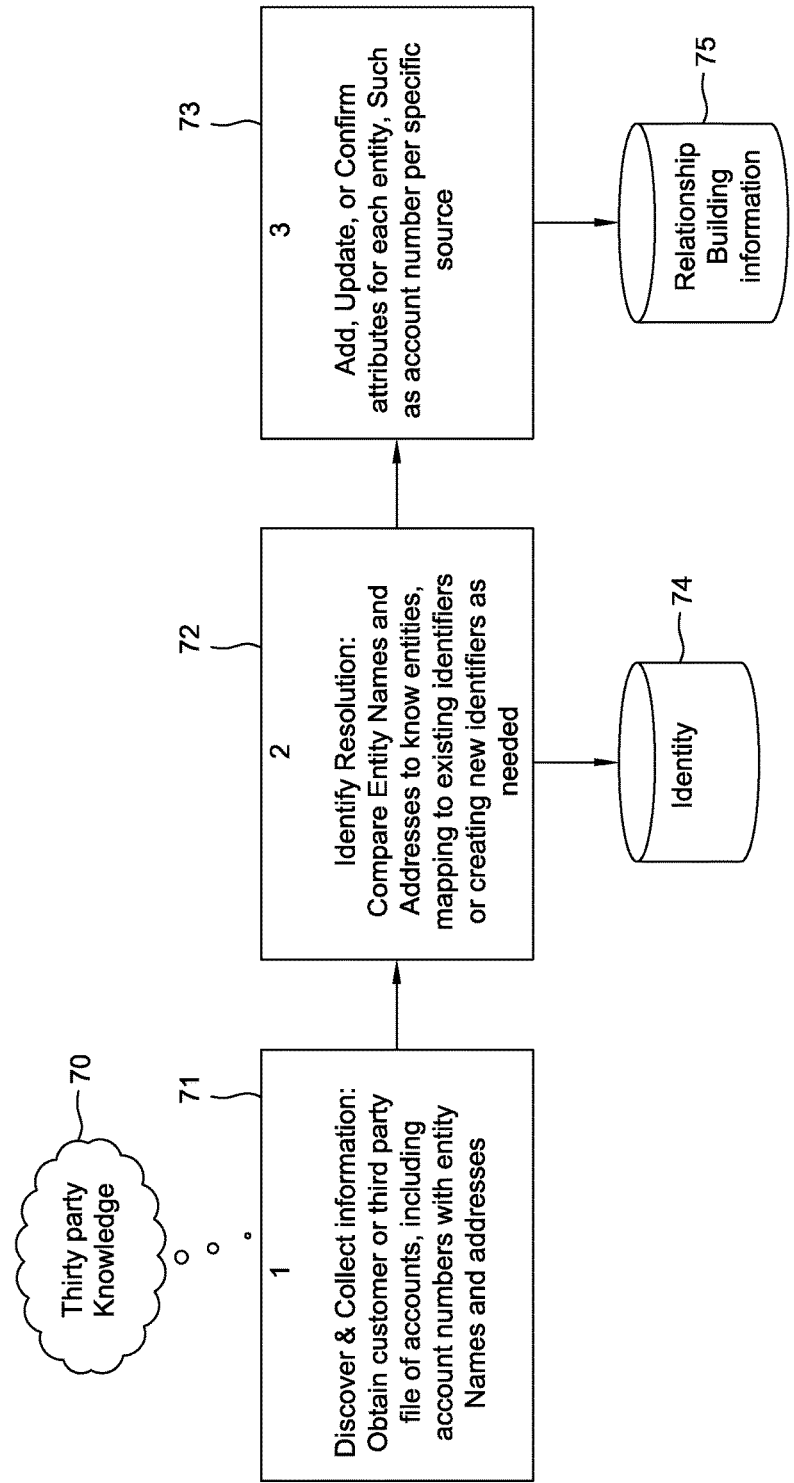
FIG. 7 is a block diagram of the discovery step according to the present disclosure.

FIG. 7 is a block diagram of the discovery step according to the present disclosure, wherein third party knowledge or information 70 is discovered and collected 71 from customer or third party file of accounts, including account numbers with entity names and addresses. The process then undertakes the step of identity resolution 72, wherein entity names and addresses are compared to known entities, mapped to existing identifiers or to newly recognized entities and their identifiers as needed. The identity resolution results are then stored in database 74. Thereafter, the process adds, updates or confirms attributes for each entity, such as account number per specific source 73 and stores in relationship building information database 75. Databases used by the system are represented logically and may actually be created and maintained as a single database.

Figure 8:
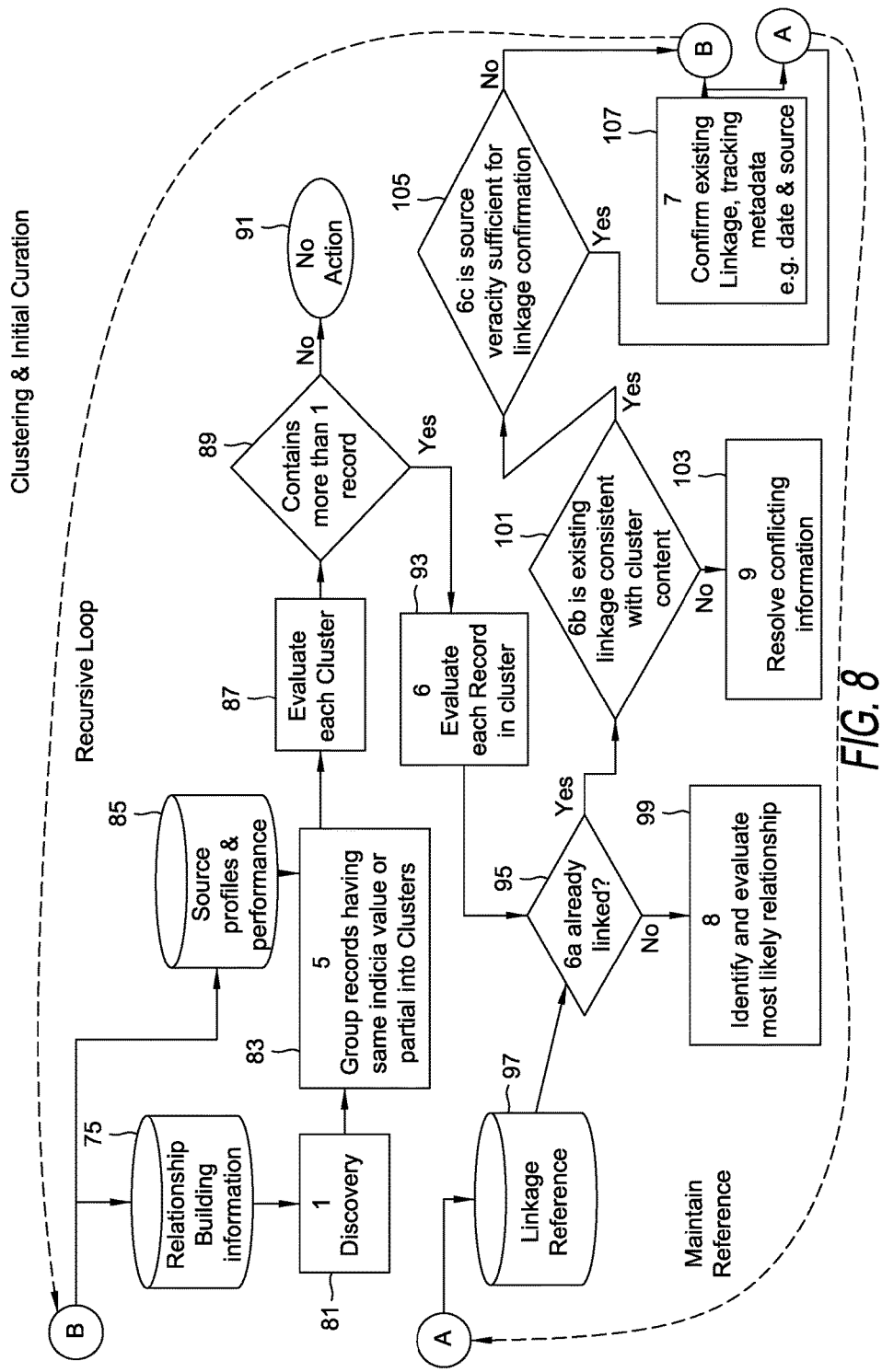
FIG. 8 is a logic diagram of account number or other indicia clustering and initial curation processes according the present disclosure.

FIG. 8 is a logic diagram of account number clustering and initial curation processes according the present disclosure. This diagram demonstrates the recursive nature of the clustering, curation and adjudication processes. Step B is shown as a reference point only as a waypoint in the recursion process, not as a first step in a sequential process. Curation and adjudication decisions made during prior processing have updated the relationship building information database 75. The same relationship building information database 75 is used in discovery step 81 and in other processes, such as Curation and Adjudication. Discovered information from step 81 is processed in step 83 together with source profiles and performance information 85 by grouping records having the same indicia value or partial value into clusters and thereafter each cluster is evaluated 87. Thereafter, the process determines if the cluster contains more than one (1) record 89. If it does not contain more than 1 record then no action is taken 91. However, if it does contain more than 1 record, then each record in a cluster is evaluated 93. If a record in a cluster is not already linked 95 to a record in a linkage reference database 97, then the process identifies and evaluates the most likely relationship 99. If already linked, then the process determines if the existing linkage is consistent with the cluster content 101. If not consistent, then the process attempts to resolve any conflicting information 103. If consistent, then the process determines if source veracity is sufficient for linkage confirmation 105. If not sufficient, then update (B) the relationship building information database 75 to reflect the decision to not use this discovered information to confirm the existent business linkage. If sufficient, then confirm existing linkage (A), tracking metadata, e.g., date and source, 107 in the linkage reference database 97, and update (B) the relationship building information database 75 reflect the decision to use this discovered information to confirm the existent business linkage.

Figure 9A:
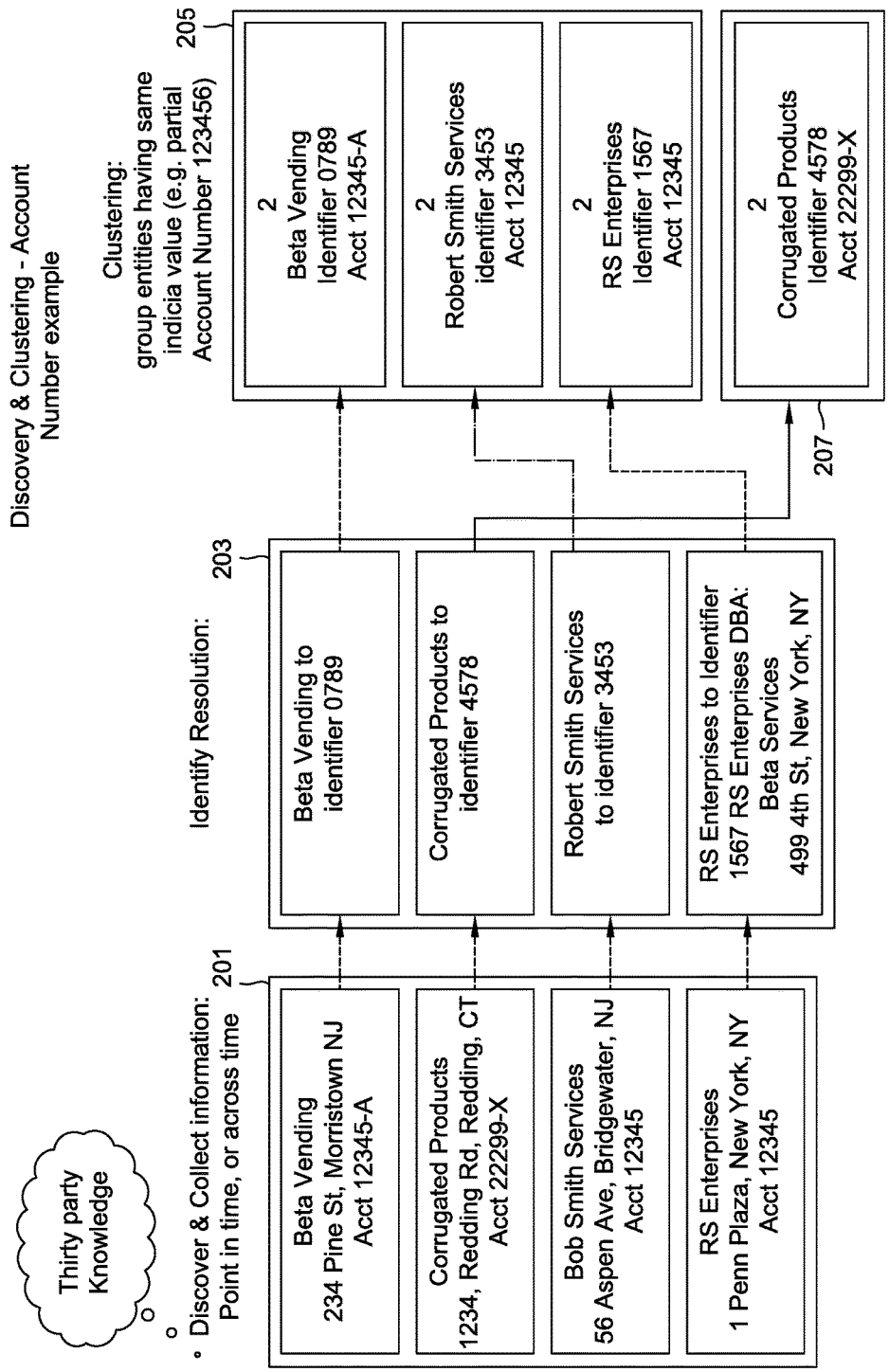
FIG. 9a is a process flow diagram which illustrates by example the discovery and account number clustering steps according to the present disclosure.

FIG. 9a is a process flow diagram of the discovery and account clustering steps according to the present disclosure, wherein an example of various entities are discovered 201 with respective account numbers, followed by identity resolution 203 wherein a corporate identifier is assigned to the entity based upon the name of entity, street address, or other identity attributes. The entities are clustered if they have the same indicia value such as, partial account number 12345 (205) or account number 2299-X (207).

Figure 9B:
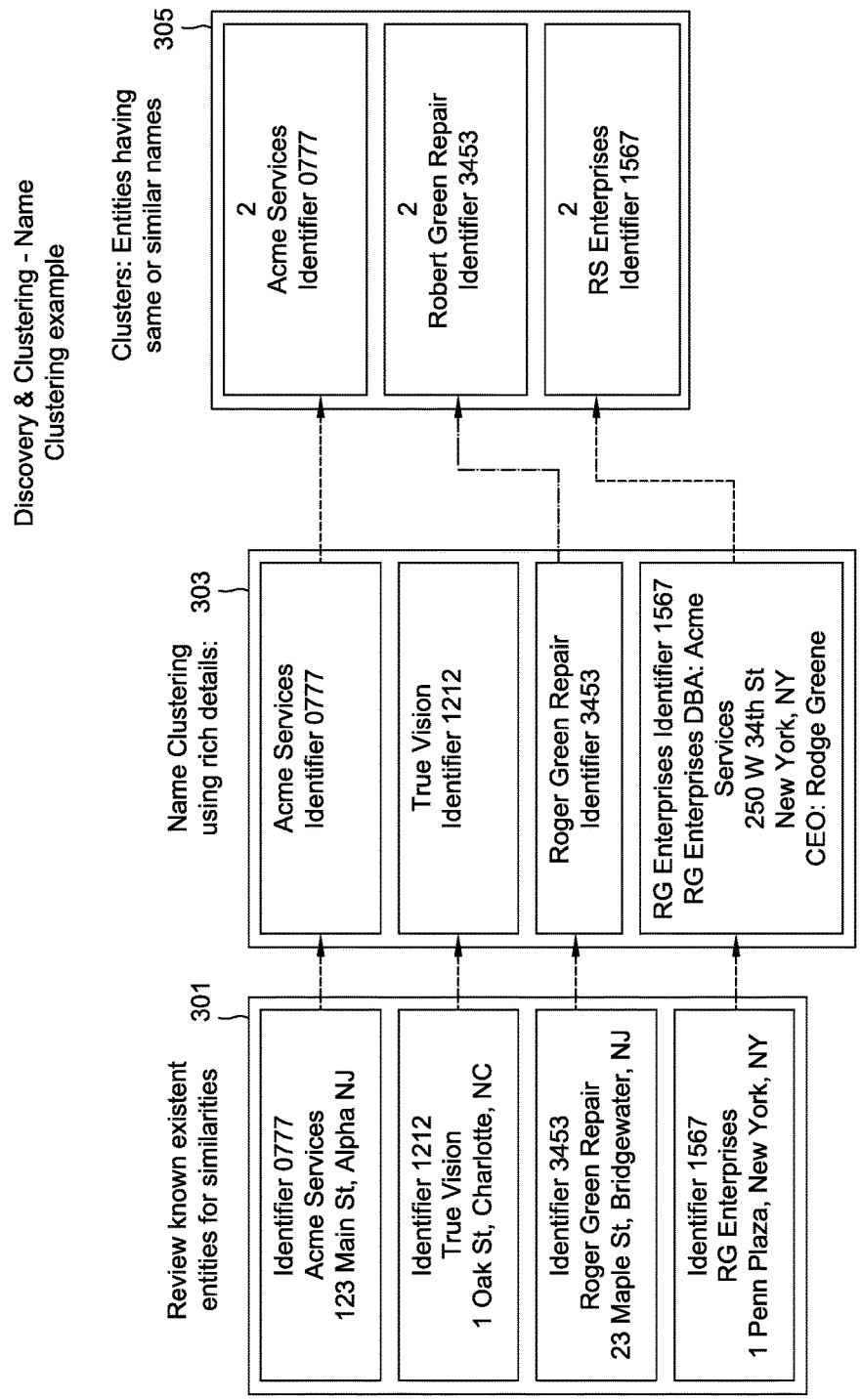
FIG. 9b is a process flow diagram which illustrates by example the discovery and name clustering steps according to the present disclosure.

FIG. 9b is a process flow diagram of the discovery and name clustering steps according to the present disclosure, wherein known existing entities are reviewed for similarities across attributes 303, and entities having sufficiently similar attributes, such as business name, trade style, location, phone, or other identifier, are clustered based upon those similarities 305.

Figure 9C:
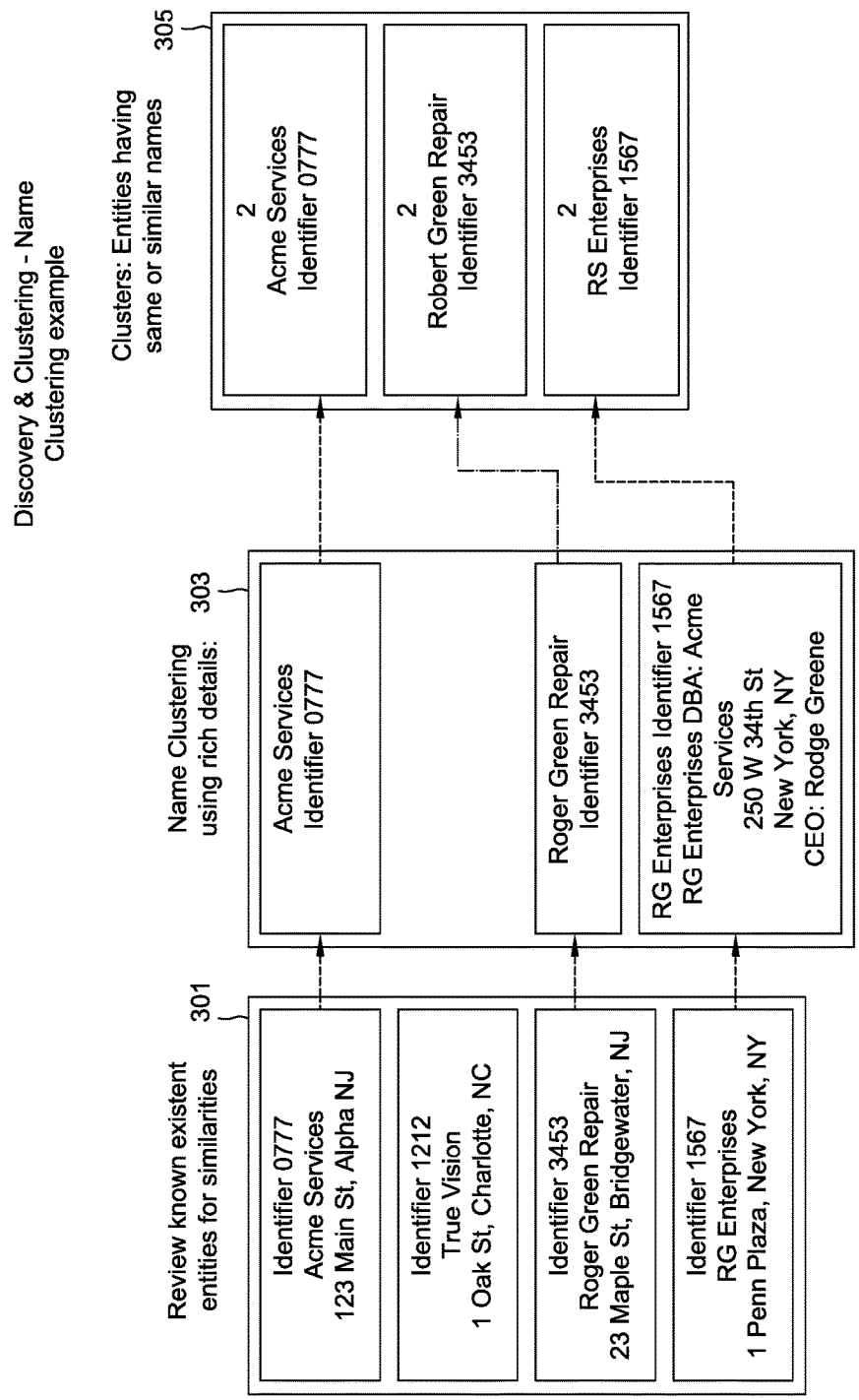
FIG. 9c is a process flow diagram which illustrates by example the discovery and name clustering showing a scenario where other entities are similar and thus warrant the formation of a cluster.

FIG. 9c is a process flow diagram of the discovery and name clustering showing a scenario where other entities are similar and thus warrant the formation of a cluster.

Figure 9D:
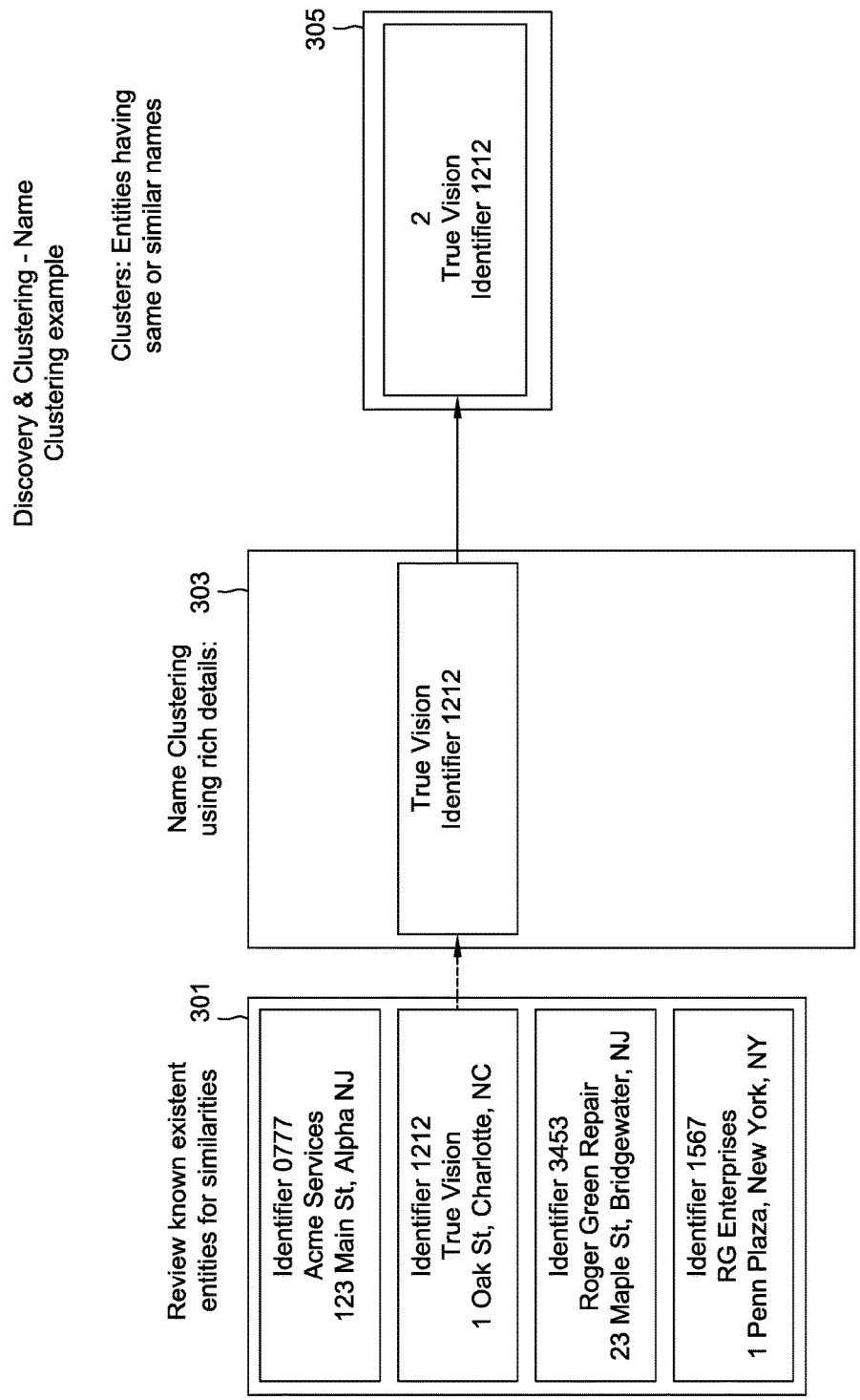
FIG. 9d is a process flow diagram which illustrates by example the discovery and name clustering showing a scenario where no other entities are sufficiently similar to create a cluster with more than one member.

FIG. 9d is a process flow diagram of the discovery and name clustering showing a scenario where no other entities are sufficiently similar to create a cluster with more than one member.

Figure 10A:
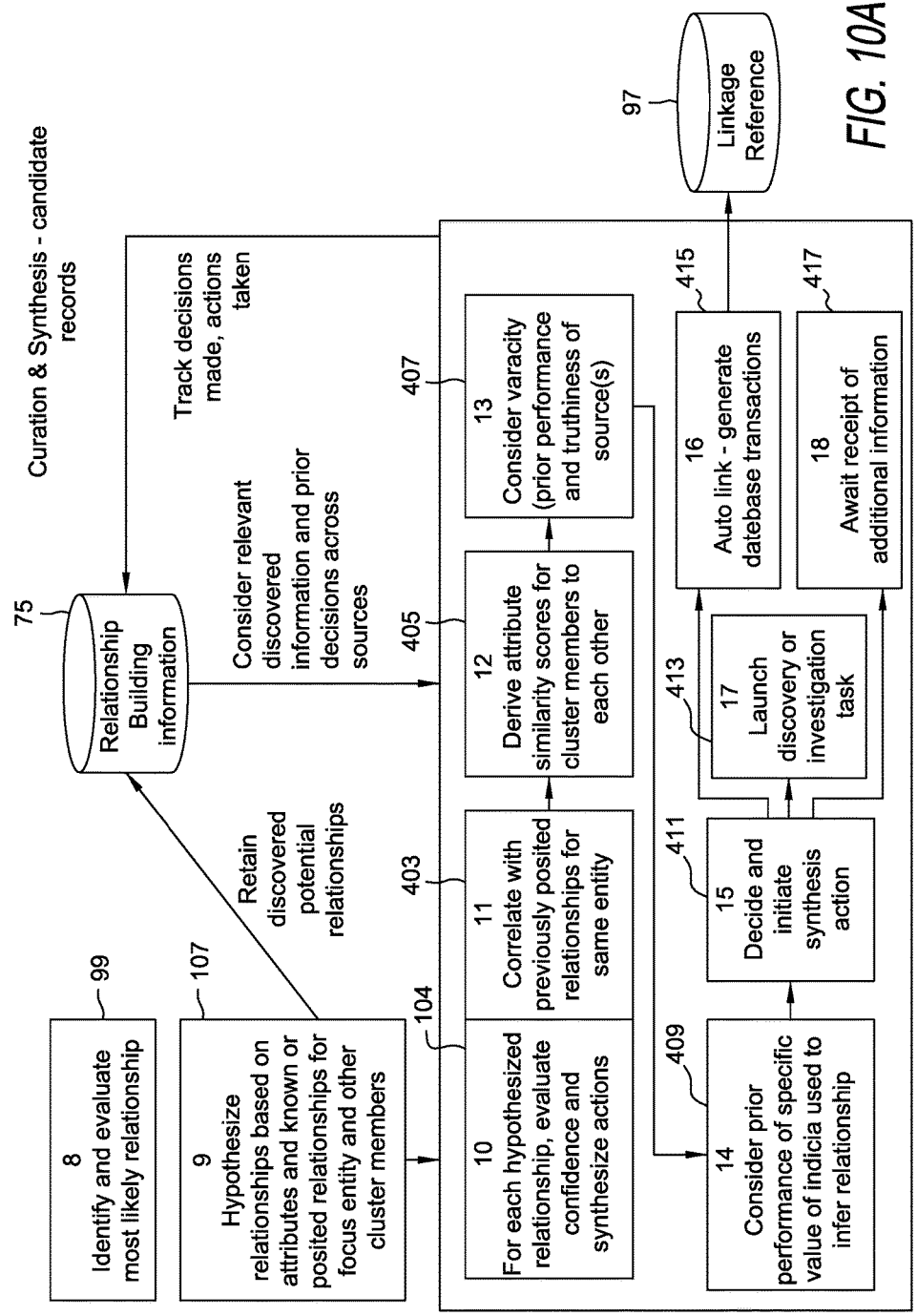
FIGS. 10a and b are process flow diagrams of the curation and synthesis steps for candidate records according to the present disclosure.
Figure 10B:
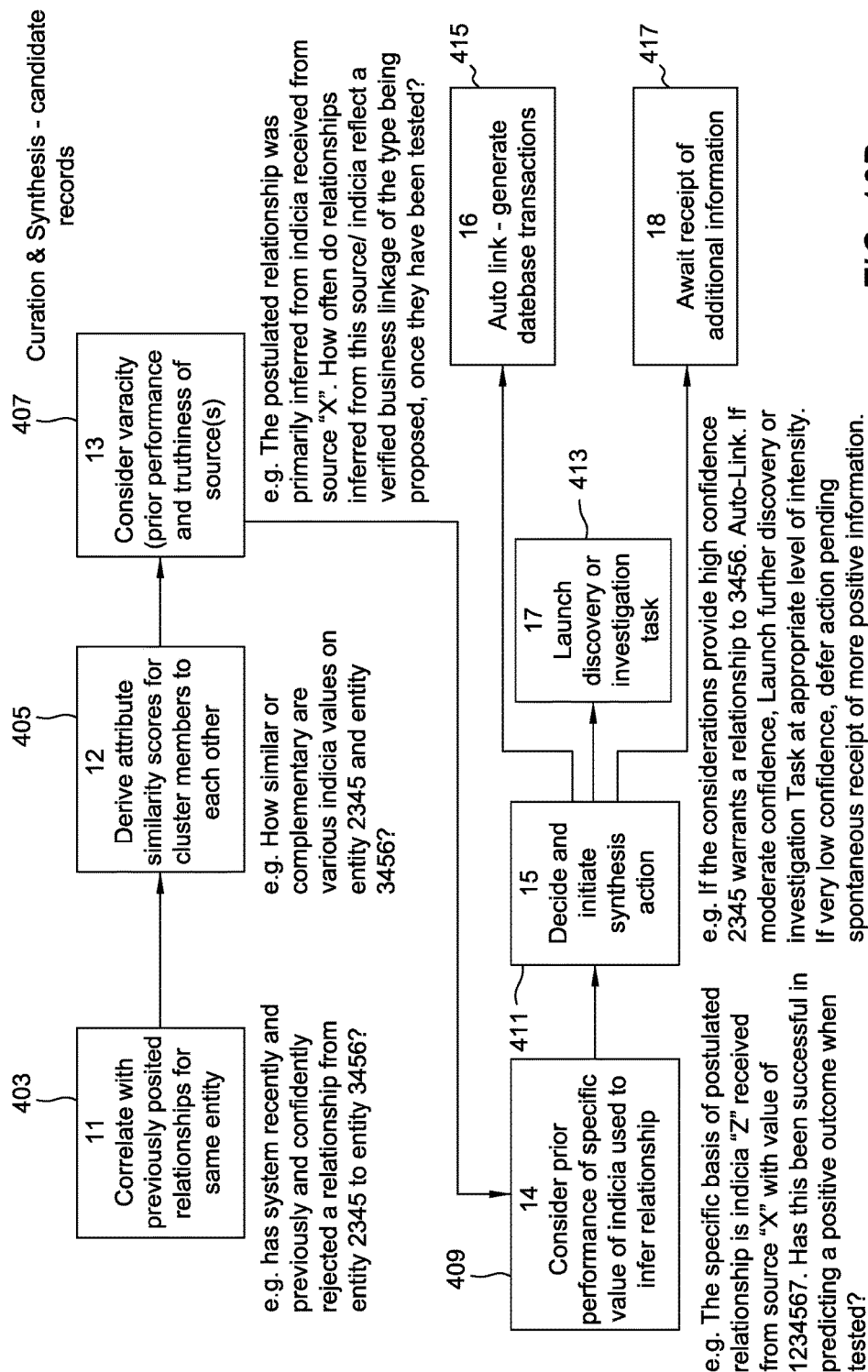

FIGS. 10a and b depict the process flow of the curation and synthesis steps according to the present disclosure which occurs after discovery and clustering for unlinked records. Identify and evaluate most likely relationship for unlinked records 99 by postulating relationships based on attributes and/or known or previously postulated relationships for focus entity and other cluster members 103. Retain or store discovered potential relationships in relationship building information database 75. For each postulated relationship, evaluate confidence and synthesize actions 401, correlate with previously posited relationships for same entity 403, derive attribute similarity scores for cluster members to each other 405, and consider veracity (prior performance and truthiness of source(s) 407. Thereafter, consider prior performance of specific value of indicia used to infer relationship 409, and decide and initiate synthesis action 411. Thereafter, launch discovery or investigation task 413, await receipt of additional information 417 and/or auto link (i.e. generate database transactions) 415 and forward to linkage reference database 97.

Figure 11:
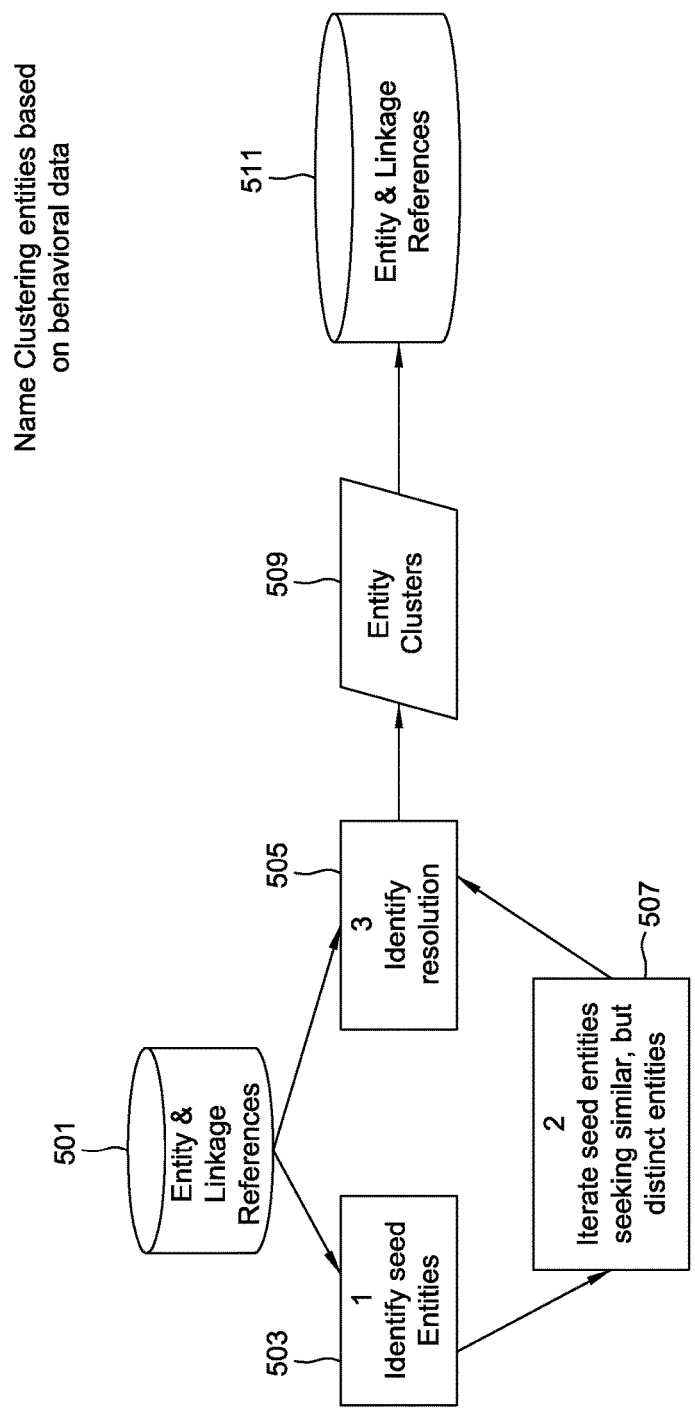
FIG. 11 is a block diagram depicting how similar extant entities are clustered based on behavioral or previously persisted data attributes according to the present disclosure.

FIG. 11 is a block diagram depicting how similar entities are clustered based on behavioral or previously persisted data attributes according to the present disclosure, wherein entity and linkage reference database 501 is used to identify seed entities 503 which may be then evaluated by identity resolution 505 processes to seek similar, yet distinct entities and cluster each original seed entity with those other entities determined to be similar 509. Entity clusters 509 are then stored in entity and relationship building information database 511 so they may be curated.

Figure 12A:
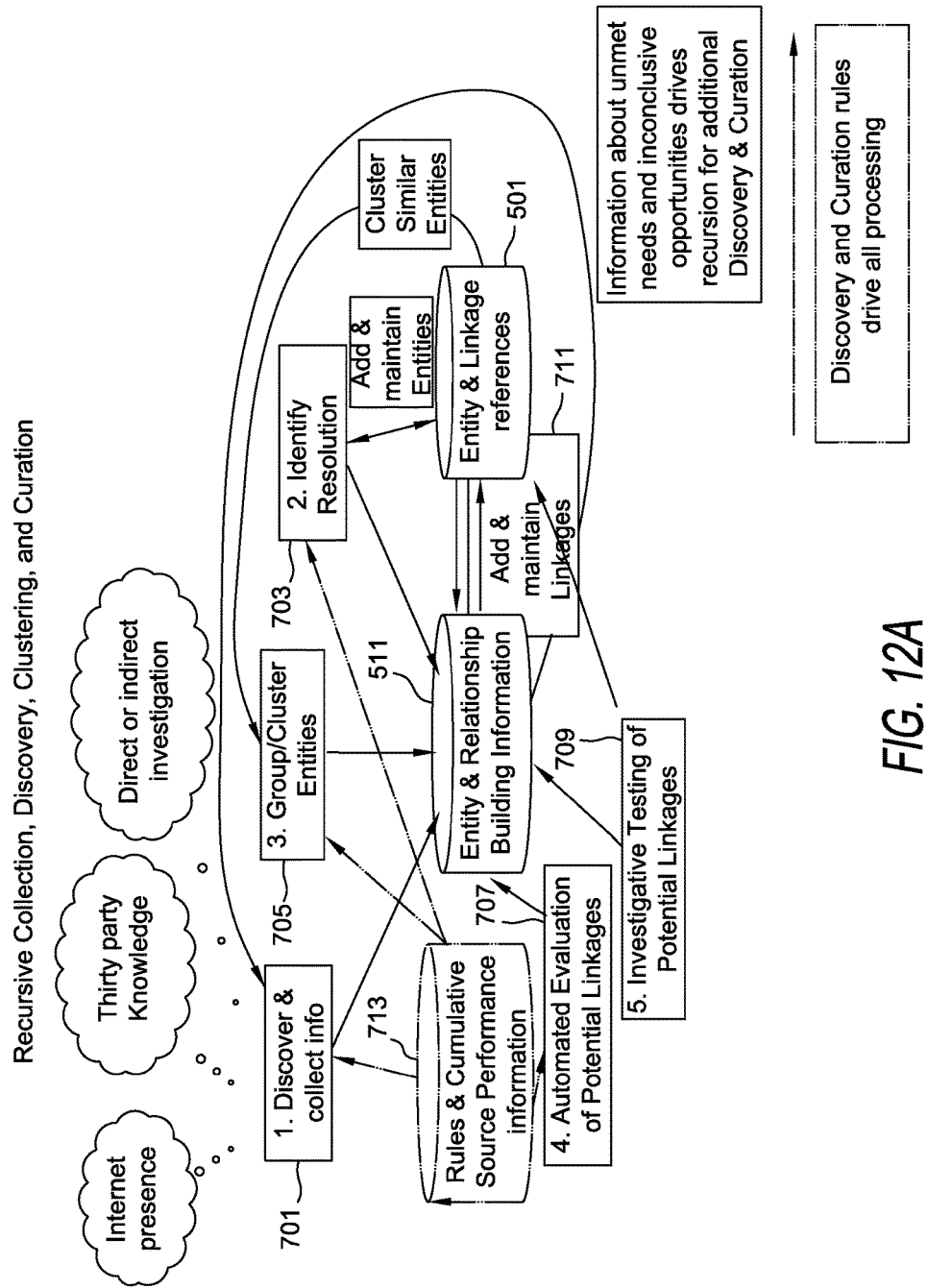
FIGS. 12a through 12c are process flow diagrams illustrating how rules driven processing continuously improves through self-learning according to the present disclosure.
Figure 12B:
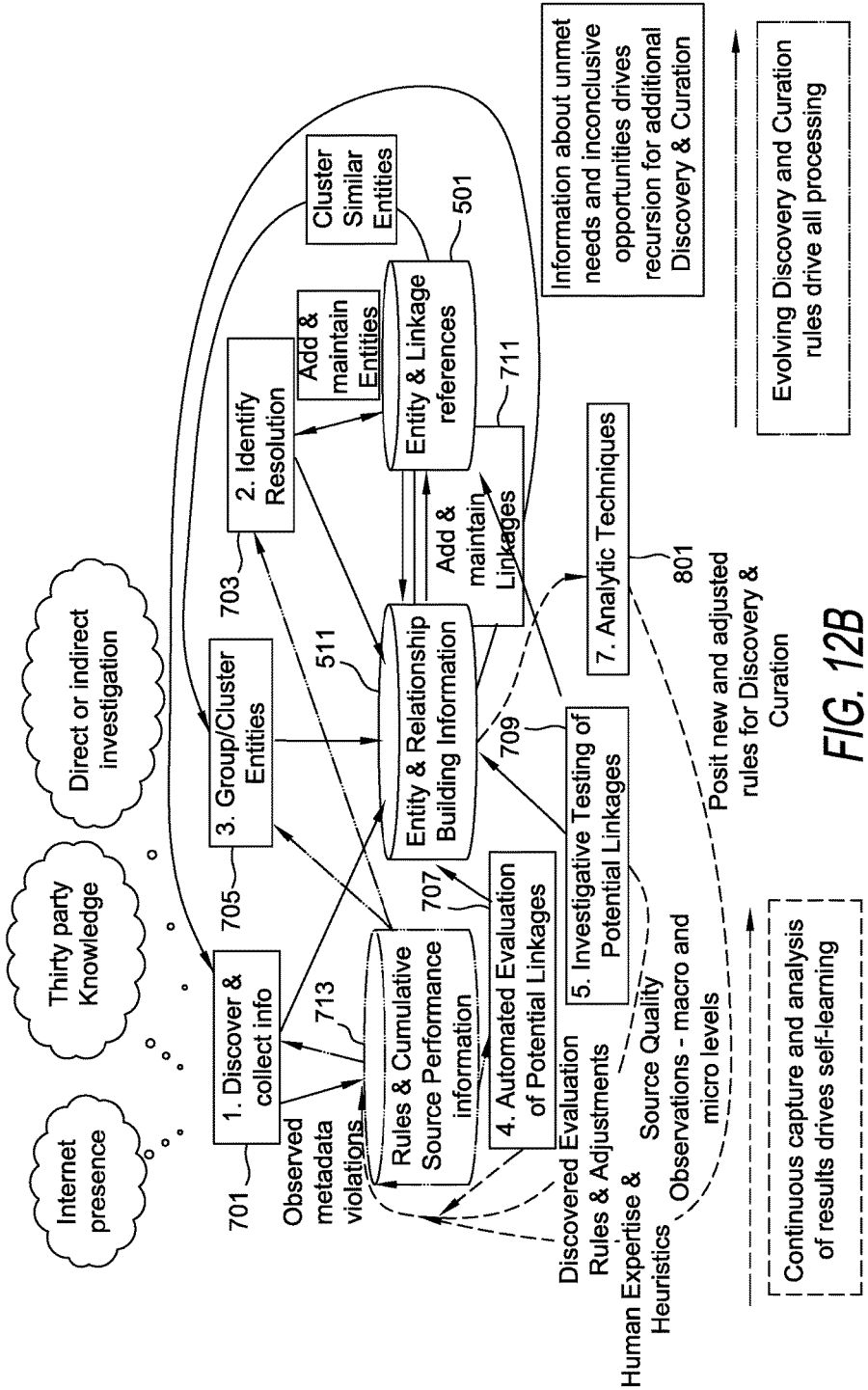
Figure 12C:
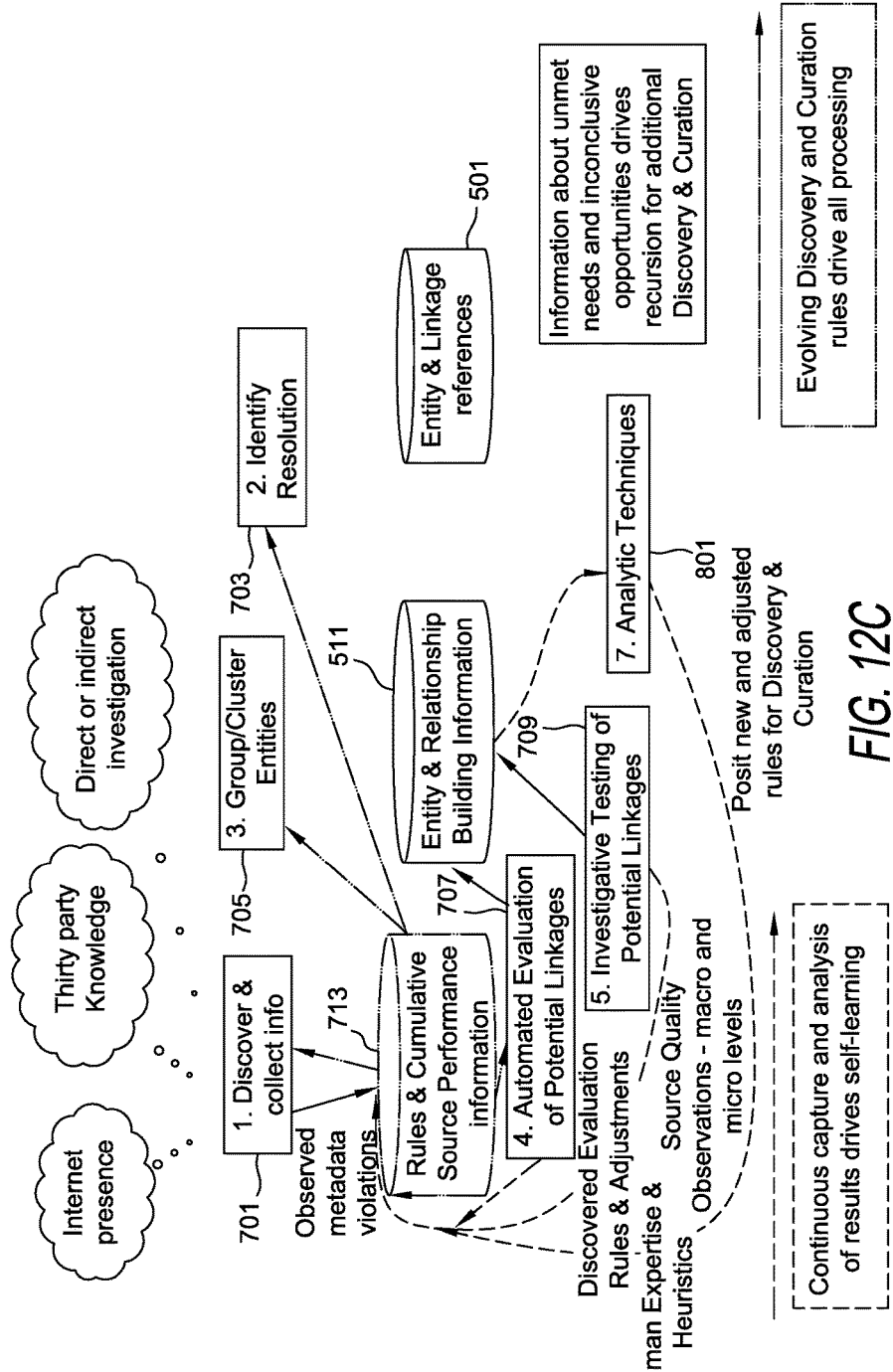

FIGS. 12a through 12c are process flow diagrams illustrating how rules driven processing continuously improves through self-learning according to the present disclosure. FIG. 12a shows the recursive nature of the core process. FIG. 12b adds interactions to support tracking and assessment of performance to support self-learning. Finally, FIG. 12c hides most of the core process interactions to better highlight the feedback flows of tracking and assessment driving self-learning to impact the way the rules will control the process in improved ways as the system matures based on experience.

In FIG. 12a, discovery and collection of information 701, identity resolution 703, grouping and clustering of entities 705, automated evaluation of potential linkages 707, and investigative testing of potential linkages 709 all interact via the relationship building information database 511 to identify potential relationships and evaluate them. The processes are controlled by Rules and Cumulative Source Performance Information. Depending on decisions taken, additional Discovery may be initiated 701 to fulfill unmet needs and drive recursion for additional discovery and curation. Alternatively, if a potential relationship is approved or rejected, add and maintain linkages and lack of linkages 711 in the Entity and Linkage Reference database 501.

FIG. 12b helps to explain the unique self-learning of the present disclosure, wherein continuous capture and analysis of results drive self-learning. Analytics techniques 801 are applied to analyze data accumulated in the Entity and relationship building information database 511, with the objective of gaining insight into opportunities to refine the rules used to Discover, Curate, and Adjudicate relationships. The type of data analyzed may include, but is not limited to, which sources and indicia were used to discover potential relationships, how it compares with other sources for relationship information on the same entity or entities, and the outcome of investigative testing of such relationships for the focus and other entities. This may reveal insights, such as that a particular indicia when received from a particular discovery source is highly predictive of approved business linkage. Such an observation is then leveraged to refine the rules governing the future adjudication of relationships discovered via that source and indicia. Analytic techniques 801 then posit new and adjusted rules for discovery and curation in Rules and Cumulative Source Performance Information database 713. Some of the data used by both Analytic Techniques 801, and leveraged by Rules established and matured with the Rules & Cumulative Source Performance Information database 713 is collected as feedback from observed metadata violations during discovery and collection of information 701, source quality observations (i.e. macro and micro levels) from investigative testing of potential linkages 709, automated evaluation of potential linkages 707, discovered evaluation rules and adjustments, and human expertise and heuristics observed during investigative testing of Potential Linkages 709 and analysis of such results. The updated rules and cumulative source performance information in database 713 continues to control processes, such as discovery and collection of information 701, group/cluster entities 705, identity resolution 703, and automated evaluation of potential linkages 707, but does so with improved performance outcomes due to the learnings generated based on the feedback flows described above.

FIG. 12c helps to highlight the self-learning aspect of FIG. 12b, but showing only a limited portion of the normal core process flows, while retaining the feedback interactions (designated by consistently dashed lines in the diagrams), and retaining the rules interactions controlling the core processes (designated by mixed dashed/dotted lines in the diagrams).

While we have shown and described several embodiments in accordance with our invention, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A computer-implemented method for automatically updating a database of relationship information identifying an existence of dyadic or multi-counterparty business relationships between parties by utilizing a multidimensional recursive process, said method comprising:
   a. collecting, by a processor, information from a plurality of data sources;
   b. identifying, by the processor, from said collected information, parties by performing identity resolution comprising assigning a respective identifier to each respective party based on at least one identifying attribute, mapping the collected information to each respective identifier to generate a plurality of party records, and storing the plurality of party records in an identity resolution database;
   c. adding, updating or confirming the at least one identifying attribute for each respective identity and storing the update in a relationship building database;
   d. clustering, by the processor, at least a subset of said parties based on common or partially intersecting identifying attributes between said parties, thereby forming clustered parties;
   e. storing the clustered parties in the relationship building database
   f. evaluating, by the processor, said clustered parties for existence of a business relationship between the clustered parties by integrating said collected information and contextually assessing indicia from said data sources to:
      (i) detect and measure consistency and inconsistency for a given party or dyadic or multi-counterparty relationship;
      (ii) evaluate relationship type and role said party plays in each relationship; and
      (iii) assess the confidence level regarding the likelihood that said dyadic or multi-counterparty business relationship exists between said parties;
   g. updating, by the processor, based on the assessed confidence level, the database of relationship information, wherein the updating comprises at least one of:
      automatically generating and storing a linkage reference record for an identified existing party or multi-counterparty relationship from the clustered parties in a linkage reference database; and
      updating the relationship building database with decision data from the evaluation, wherein the decision data includes candidate records including potential relationship linkages for unlinked party records from the clustered parties; and
   h. implementing, by the processor, self-learning to improve the ability of said multidimensional recursive process, wherein the self-learning comprises (i) continuously tracking veracity of the data sources, wherein the tracking of veracity of the data sources comprises tracking metadata information as part of the collecting of information from the data sources, (ii) analyzing the tracked data of the data sources (iii) collecting and updating a rules database with feedback data including the tracked and analyzed data, and (iv) adjusting the evaluation for existence of the business relationship between said parties by taking into consideration the tracked veracity of the data sources.

2. The method according to claim 1, wherein the tracking of the metadata information comprises tracking metadata exceptions occurring during the collecting of information from the data sources.

3. The method according to claim 1, wherein said implementing of self-learning further comprises at least one of: (a) using seed rules posited for evaluating the potential that said dyadic or multi-counterparty relationship exists between said parties; (b) applying applicable candidate records from a currently known corpus of rules to said collected information in the rules database to evaluate said clusters of said parties for quantity, quality and/or character of relationships discovered; and (c) using detailed truth determination to leverage expertise and additional information to assess truth about potential relationships in said clustered parties.

4. The method according to claim 3, further comprising the step of continuously curating said adjudication rules, wherein said process leverages experience gained through said detailed truth determination to tune, improve and/or adjust said seed rules used for evaluating the potential that said dyadic or multi-counterparty relationship exists between said parties.

5. The method according to claim 1, wherein said clustering said parties is based on a flexible range of indicia.

6. The method according to claim 5, wherein said indicia is at least one selected from the group consisting of: behavioral data, names, inception characteristics, size, and industry.

7. The method according to claim 1, wherein said common or partially intersecting identifying attributes comprise at least one of: Internet address details, account or other external identifier, name similarity, address, secondary address, common related individual, on behalf of relationships, and knowledge, opinion, or hypothesized relationships.

8. The method according to claim 1, wherein said step of assessing the confidence level regarding the likelihood that said dyadic or multi-counterparty relationship exists between said parties is based upon rules related to prior experience with similar data points for other parties and potential relationships, and/or same data points for other parties and potential relationships.

9. The method according to claim 3, wherein step (f) (iii) improves the processes ability to assess potential and existing relationships and whether they should automatically qualify to become said business linkage, require more collecting of said information and evaluating of said clustered parties for business linkage potential, or are insufficiently likely to exist and warrant no further active attention.

10. The method according to claim 1, wherein said collecting information involves discovery of at least one of: identifying new sources of said information, evaluating the quality of said source, understanding changes in the data environment, and developing new technologies and processes for identification of appropriate data.

11. A system for automatically updating at least one database of relationship information identifying an existence of dyadic or multi-counterparty business relationships between parties by utilizing a multidimensional recursive process, said system comprising:
   a processor; and a memory that contains instructions that are readable by said processor, and that when read by said processor cause said processor to perform actions of:
- a. collecting information from a plurality of data sources and generating source profile records for a source profile and performance database, wherein the source profile records include metadata information;
- b. identifying, from said collected information, parties by performing identity resolution comprising assigning a respective identifier to each respective party based on at least one identifying attribute, mapping the collected information to each respective identifier to generate a plurality of party records, and storing the plurality of party records in an identity resolution database;
- c. adding, updating or confirming, for each party record, the at least one identifying attribute for each respective party, and storing the update in a relationship building database;
- c. clustering said plurality of party records into groups based on common or partially intersecting identifying attributes between said parties, thereby forming clustered parties;
- d. storing the clustered parties in a relationship building database;
- e. evaluating said clustered parties for existence of a business relationship between the clustered parties by integrating said collected information and contextually assessing indicia from said data sources to:
  - (i) detect and measure consistency and inconsistency for a given party or multi-counterparty relationship;
  - (ii) evaluate relationship type and role said party plays in each relationship; and
  - (iii) assess the confidence level regarding the likelihood that said dyadic or multi-counterparty business relationship exists between said parties;
- f. updating, based on the assessed confidence level, the at least one database of relationship information, wherein the updating comprises at least one of: automatically generating and storing a linkage reference record for an identified existing party or multi-counterparty relationship from the clustered parties in a linkage reference database; and updating the relationship building database with decision data from the evaluation, wherein the decision data includes candidate records including potential relationship linkages for unlinked party records from the clustered parties; and
- g. implementing self-learning to improve the ability of said multidimensional recursive process, wherein the self-learning comprises (i) continuously tracking veracity of the data sources, wherein the tracking of veracity of the data sources comprises tracking metadata information as part of the collecting of information from the data sources, (ii) analyzing the tracked data of the data sources (iii) collecting and updating a rules database with feedback data including the tracked and analyzed data and (iv) adjusting the evaluation for existence of the business relationship between said parties by taking into consideration the tracked veracity of the data sources, wherein the tracking metadata includes tracking date and source metadata.

12. The system according to claim 11 wherein the tracking of the metadata information comprises tracking metadata exceptions occurring during the collecting of information from the data sources.

13. The system according to claim 11, wherein said implementing of self-learning further comprises at least one of: (a) using seed rules posited for evaluating the potential that said dyadic or multi-counterparty relationship exists between said parties; (b) applying applicable candidates from the currently known corpus of rules to said collected information to evaluate said clusters of said parties for quantity, quality and/or character of relationships discovered; and (c) using detailed truth determination to leverage expertise and additional information to assess truth about potential relationships in said clustered parties.

14. The system according to claim 13, further comprising the step of continuously curating said adjudication rules, wherein said system leverages experience gained through said detailed truth determination to tune, improve and/or adjust said seed rules used for evaluating the potential that said dyadic or multi-counterparty relationship exists between said parties.

15. The system according to claim 11, wherein said clustering said parties is based on a flexible range of indicia.

16. The system according to claim 15, wherein said indicia is at least one selected from the group consisting of: behavioral data, names, inception characteristics, size, and industry.

17. The system according to claim 11, wherein said common or partially intersecting identifying attributes comprise at least one of: Internet presence details, account or other external identifier, name similarity, address, secondary address, related individual, on behalf of relationships, and knowledge, opinion, or hypothesized relationships.

18. The system according to claim 11, wherein said step of assessing the confidence level regarding the likelihood that said dyadic or multi-counterparty relationship exists between said parties is based upon rules related to prior experience with similar data points for other parties and potential relationships.

19. The system according to claim 12, wherein said step of assessing the confidence level regarding the likelihood that said dyadic or multi-counterparty relationship exists between said parties is based upon rules related to prior experience with similar data points for other parties and potential relationships.

20. The system according to claim 13, wherein step (e)(iii) improves the system's ability to assess potential and existing relationships and whether they should automatically qualify to become said business linkage, require more collecting of said information and evaluating of said clustered parties for business linkage potential, or are insufficiently likely to exist and warrant no further active attention.

21. The system according to claim 11, wherein said collecting information involves discovery of at least one of: identifying new sources of said information, evaluating the quality of said source, understanding changes in the data environment, and developing new technologies and systems for identification of appropriate data.

22. A computer readable storage media containing executable computer program instructions which when executed cause a processing system to perform a method for automatically updating a database of relationship information identifying an existence of dyadic or multi-counterparty business relationships between parties by utilizing a multidimensional recursive process, said method comprising:

a. collecting information from a plurality of data sources and generating source profile records for a source profile and performance database, wherein the source profile records include metadata information;
b. identifying, from said collected information, parties by performing identity resolution comprising assigning a respective identifier to each respective party based on at least one identifying attribute, mapping the collected information to each respective identifier to generate a plurality of party records, and storing the plurality of party records in an identity resolution database;
c. clustering said plurality of party records into groups based on common or partially intersecting identifying attributes between said parties, thereby forming clustered parties;
d. storing the clustered parties in a relationship building database
e. evaluating said clustered parties for existence of a business relationship between the clustered parties by integrating said collected information and contextually assessing indicia from said data sources to:
  (i) detect and measure consistency and inconsistency for a given party or dyadic or multi-counterparty relationship;
  (ii) evaluate relationship type and role said party plays in each relationship; and
  (iii) assess the confidence level regarding the likelihood that said dyadic or multi-counterparty business relationship exists between said parties;
f. updating, based on the assessed confidence level, the database of relationship information wherein the updated comprises at least one of;
  automatically generating and storing a linkage reference record for an identified existing party or multi-counterparty relationship from the clustered parties in a linkage reference database; and
  updating the relationship building database with decision data from the evaluation, wherein the decision data includes candidate records including potential relationship linkages for unlinked party records from the clustered parties and
g. implementing self-learning to improve the ability of said multidimensional recursive process, wherein the self-learning comprises (i) continuously tracking veracity of the data sources, wherein the tracking of veracity of the data sources comprises tracking metadata information as part of the collecting of information from the data sources, (ii) analyzing the tracked data of the data sources (iii) collecting and updating a rules database with feedback data including the tracked and analyzed data and (iv) adjusting the evaluation for existence of the business relationship between said parties by taking into consideration the tracked veracity of the data sources.

23. The method according to claim 3, wherein the method further comprises at least one of:
  (d) learning which of said seed rules and said plurality of data sources are most useful in determining that said dyadic or multi-counterparty relationship exists between said parties, and (e) leveraging experience to discover and posit adjudication rules proposing additional indicia, new rules or enhancement to said seed rules.

24. The system according to claim 13, wherein the system further comprises the step of at least one of:
  (d) learning which of said seed rules and said plurality of data sources are most useful in determining that said dyadic or multi-counterparty relationship exists between said parties, and (e) leveraging experience to discover and posit adjudication rules proposing additional indicia, new rules or enhancement to said seed rules.

* * * * *